United States Patent
Blatter et al.

(10) Patent No.: US 12,479,118 B2
(45) Date of Patent: Nov. 25, 2025

(54) MACHINE LEARNING FOR A PERSONAL CARE DEVICE

(71) Applicant: Edgewell Personal Care Brands, LLC, Chesterfield, MO (US)

(72) Inventors: Alan Blatter, Sandy Hook, CT (US); James Chasen, West Haven, CT (US); Gregory Sweeney, Cincinnati, OH (US); Avery Griffin, Cincinnati, OH (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 545 days.

(21) Appl. No.: 17/906,799

(22) PCT Filed: Jun. 24, 2021

(86) PCT No.: PCT/US2021/038856
§ 371 (c)(1),
(2) Date: Sep. 20, 2022

(87) PCT Pub. No.: WO2021/262955
PCT Pub. Date: Dec. 30, 2021

(65) Prior Publication Data
US 2023/0211515 A1     Jul. 6, 2023

Related U.S. Application Data

(60) Provisional application No. 63/043,451, filed on Jun. 24, 2020.

(51) Int. Cl.
*B26B 21/00* (2006.01)
*B26B 21/40* (2006.01)

(52) U.S. Cl.
CPC ...... *B26B 21/4087* (2013.01); *B26B 21/4056* (2013.01)

(58) Field of Classification Search
None
See application file for complete search history.

(56) References Cited

U.S. PATENT DOCUMENTS

2016/0167241 A1   6/2016  Goldfarb et al.
2018/0180443 A1*  6/2018  Han ..................... G01C 22/006
(Continued)

FOREIGN PATENT DOCUMENTS

JP   2009240760 A   10/2009
JP   2017-060661 A   3/2017
(Continued)

OTHER PUBLICATIONS

Unofficial English Translation of Office Action issued in connection with corresponding Japanese Application No. 2022-558092 dated Oct. 10, 2024.
(Continued)

*Primary Examiner* — Paul B Yanchus, III
(74) *Attorney, Agent, or Firm* — Edgar Rodriguez

(57) ABSTRACT

Systems, devices, and methods for applying machine learning to provide feedback related to a personal care device are described. Embodiments of the systems, devices, and methods may identify data from a device such as a razor comprising a plurality of sensors on a razor, predict one or more features such as shaving features based on the data using a machine learning model trained using data from the plurality of sensors, and provide shaving feedback based on the one or more features such as shaving features. Embodiments of the systems, devices, and methods may train a machine learning model, execute a trained machine learning model, capture and/or process data for the machine learning model, provide feedback based on the output of the trained machine learning model, or combinations thereof.

19 Claims, 9 Drawing Sheets

(56) References Cited

U.S. PATENT DOCUMENTS

2019/0254794 A1    8/2019  Sherman et al.
2019/0306259 A1*  10/2019  Burghardt ........... B26B 21/4081
2020/0201272 A1    6/2020  Joyce et al.

FOREIGN PATENT DOCUMENTS

JP      2019-171060 A   10/2019
WO      2019/072917 A1   4/2019
WO       201972917 A1    4/2019

OTHER PUBLICATIONS

Search Report and Written Opinion issued in connection with corresponding PCT Application No. PCT/US2021/038856 dated Sep. 23, 2021.
Extended European Search Report dated Jul. 17, 2024 issued in European Patent Application No. 21828977.5.
Unofficial English Translation of Office Action issued in connection with corresponding Japanese Application No. 2022-558092 dispatched on Apr. 17, 2025.

* cited by examiner

MACHINE LEARNING FOR A PERSONAL CARE DEVICE

CROSS-REFERENCE TO RELATED APPLICATIONS

This application claims priority to International Application No. PCT/US2021/038856, filed Jun. 24, 2021, which claims priority to U.S. Provisional Patent Application No. 63/043,451, filed on Jun. 24, 2020, the contents of which are incorporated herein by reference in their entirety.

TECHNICAL FIELD

The following relates generally to personal care, and more specifically to machine learning for a personal care device.

BACKGROUND

Many people use various instruments and devices for personal care and grooming. The effectiveness of any such instruments or devices depends on factors such as how it is used, is the instrument or device in sufficient condition or in need of repair or replacement (of any or all its components). As such, it is often the case that such instruments or devices have a limited useful life (or at least one or more of its components thereof), and thus its effectiveness may decrease near the end of such useful life.

To the extent a user continues to use a product beyond its useful life or after such product needs replacement components or refurbishing in general, the user may have a poor experience, potentially resulting in injury. Therefore, a need exists for systems and methods for obtaining and providing user feedback regarding use and techniques for such personal care and grooming products and the status of such instruments and/or devices.

A nonlimiting example of a personal care and grooming device or instrument is a razor. Many people use razors for personal care and grooming. The effectiveness of a razor may depend on factors such as how the razor is used, and whether a razor blade is sufficiently sharp. Thus, a razor blade has a limited useful life, and its effectiveness may decrease near the end of the useful life.

If a user applies poor shaving techniques, or if a razor is nearing the end of its useful life, the user may have a poor user experience, or may even cause themselves injury. Therefore, there is a need in the art for systems and methods for obtaining and providing user feedback regarding shaving techniques and the status of a razor.

SUMMARY

Personal care devices may include those used for grooming or cleaning, such as razors, trimmers, derma-planing instruments, facial and body brushes and scrubbers, water picks, dental cleaning tools, and toothbrushes. Personal care devices may include those that require replacement as they have a useful life, whether replacement is the entirety of the personal care device or a component of the personal care device.

A method, apparatus, non-transitory computer readable medium, and system for machine learning for a personal care device are described. Embodiments of the method, apparatus, non-transitory computer readable medium, and system may identify data from a personal care device comprising a plurality of sensors on a personal care device, predict one or more use features based on the data using a machine learning model trained using data from the plurality of sensors, and provide feedback based on the one or more use features.

The apparatus may include a processor, memory in electronic communication with the processor, and instructions stored in the memory. The instructions may be operable to cause the processor to identify data from a personal care device comprising a plurality of sensors, predict one or more use features based on the data using a machine learning model trained using data from the plurality of sensors, and provide feedback based on the one or more use features.

The non-transitory computer readable medium may store code for personal care. In some example, the code comprises instructions executable by a processor to: identify data from a personal care device comprising a plurality of sensors, predict one or more use features based on the data using a machine learning model trained using data from the plurality of sensors, and provide feedback based on the one or more use features.

In some examples, the plurality of sensors include an inertial measurement unit (IMU), a capacitance-to-digital converter, a force sensor, a rinse sensor, a grip sensor, a temperature sensor, an accelerometer, a gyroscope a magnetometer, a resistive contact, a piezo contact microphone, a Hall effect sensor, an external camera, a strain gauge, a load cell, a reed switch, a linear variable differential transformer, or any combination thereof.

In some examples, the machine learning model is trained using additional data for at least one additional sensor that is not included on the personal care device. In some examples, the at least one additional sensor comprises a force sensor.

Some examples of the method, apparatus, non-transitory computer readable medium, and system may further include receiving the data via a wireless communications connection to the personal care device. In some examples, the machine learning model is trained using survey data collected from users, wherein the survey data comprises use quality information, device end-of-life information, or both.

In some examples, the one or more features may include shaving features such as a shaving stroke count, shaving quality information, razor end-of-life information, or any combination thereof. In some examples, the feedback may include shaving feedback such as an instruction for improving shave quality. In some examples, the shaving feedback comprises razor replacement feedback.

A method, apparatus, non-transitory computer readable medium, and system for machine learning for a personal care device are described. Embodiments of the method, apparatus, non-transitory computer readable medium, and system may collect data from a plurality of sensors on a personal care device, identify one or more use features based on the data, identify a subset of the sensors, wherein at least one of the sensors is not included in the subset of the sensors, and train a machine learning model to predict the one or more features using data from the subset of the sensors.

The apparatus may include a processor, memory in electronic communication with the processor, and instructions stored in the memory. The instructions may be operable to cause the processor to collect data from a plurality of sensors on a personal care device, identify one or more use features based on the data, identify a subset of the sensors, wherein at least one of the sensors is not included in the subset of the sensors, and train a machine learning model to predict the one or more features using data from the subset of the sensors.

The non-transitory computer readable medium may store code for personal care. In some examples, the code comprises instructions executable by a processor to: collect data from a plurality of sensors on a personal care device, identify one or more use features based on the data, identify a subset of the sensors, wherein at least one of the sensors is not included in the subset of the sensors, and train a machine learning model to predict the one or more features using data from the subset of the sensors.

In some examples, the at least one of the sensors comprises a force sensor. In some examples, the one or more features may be shaving features comprising a stroke count, a stroke orientation, or both.

Some examples of the method, apparatus, non-transitory computer readable medium, and system described above may further include providing feedback based at least in part on the trained machine learning model using data from the subset of the sensors.

A method, apparatus, and system for a personal care device are described. Embodiments of the method, apparatus, and system may include a hub and a personal care device. The personal care device may provide data directly to the hub and the hub may provide the data to a server. The data may be raw data and the server may be located in the cloud. The server may implement one of the machine learning methods described above to produce a feedback based on the data. The server may also implement one of the machine learning methods to generate a replacement order for a component of the personal care device. The feedback may be provided to a computing device linked to the hub and/or personal care device.

In some examples, the data may be wirelessly provided from the personal care device to the hub. The data may be produced by at least one of a plurality of sensors disposed in the personal care device. The feedback may be wirelessly provided to the computing device linked to the hub and/or personal care device.

In some examples, the link between the hub and the server may be secure. In an embodiment, the raw data may be sent from the hub to a dedicated IP address of the server.

DETAILED DESCRIPTION

Figure 1:
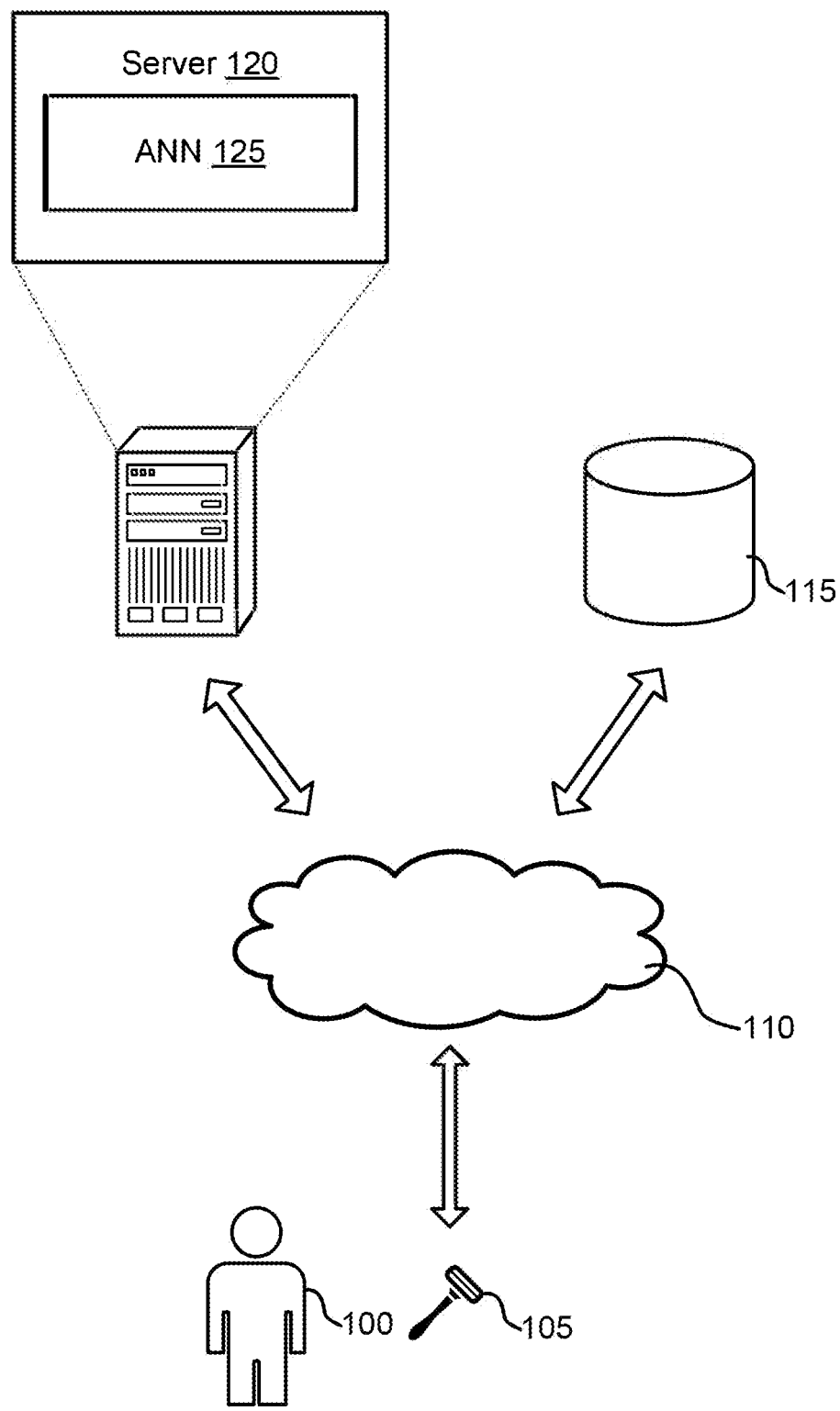
FIG. 1 shows an example of a system for personal care and/or grooming according to aspects of the present disclosure.

The present disclosure relates generally to personal care, wellness, hygiene, and grooming, and more specifically to using methods of machine learning to obtain information and provide feedback related to a personal care device.

Non-limiting embodiments of the present disclosure use machine learning techniques to identify razor data, predict shaving features based on the razor data, and provide shaving feedback. In some cases, razor data may include longevity information to predict cartridge end of life. Thus, in one exemplary embodiment, using the razor data may predict a cartridge's end of life. Razor data may include any type of signal that indicates an end user should switch the cartridge. Data driven cartridge replacement recommendation may lead to overall better shave experience for the end user. To this end, procuring data from users and optionally the specific end user can lead to predictions for a cartridge's end of life. In some examples, sensor data from a razor or other personal care device may be collected and analyzed without utilizing machine learning to predict feedback.

Embodiments of the present disclosure may use a deep machine learning model. Such a model can include an interactive personal care or grooming instrument, tool or device, such as an interactive razor. The learning model may also be referred to as the limited sensor post processing software development. One embodiment can eliminate unnecessary sensors while maintaining enough data that can be used to predict useful information for an end user such as end of life of a replaceable component such as a razor cartridge's end-of-life; additional feedback that may be of interest to the user can also be procured through data generated by the device, tool or instrument. In addition, simplification of device design such as razor design through removing at least some of the sensors obviated by training a machine learning algorithm with fewer sensors may lower the manufacturing cost of a device such as a razor and allow competitive economic production.

Exemplary embodiments of the inventive concept set forth herein describe an Internet-of-Things (IoT) razor system that can automatically provide a user with replacement blades and/or feedback based on their behavior. In brief, the IoT razor system includes a razor equipped with a plurality of sensors that generate raw data as a user shaves and a short-range wireless communication device to output the raw data. The IoT razor system additionally includes a hub configured to receive the raw data from the razor and provide the raw data to a server via the cloud. The server then processes the raw data to predict, for example, an end-of-life for a razor cartridge, and generate a replacement order that is automatically issued for a new razor cartridge based on the predicted shaving feature (e.g., predicted end-of-life, etc.).

Additionally, a notification based on the predicted shaving feature may be provided to the user. The notification may include, without limitation, diagnostic feedback (e.g., instructions on alternative shave procedures, current life/usage levels, etc.), recommendations of various consumer products (e.g., another type of cartridge based on the predicted shaving feature, a pre or post-use skin care product such as a shaving aid preparation based on the predicted shaving feature, etc.), confirmation for a replacement order (e.g., order status, delivery status, acknowledgment or acceptance of order, etc.), messages (e.g., visual, audible, tactile, etc.), and so forth. In one embodiment, the notification may be communicated to a user of the razor via an IoT device co-located in a geographic location with any or all components of the IoT razor system. For example, the notification may be with a smart mirror, smart faucet or smart shower head, user computing platform (e.g., a smart phone, a smart watch, etc.), diodes on the razor and/or the hub, and so forth.

Embodiments of the present disclosure use one or more Artificial Neural Networks (ANNs). In some cases, ANNs may improve the ability to contain a large number of input parameters or features. ANNs may learn from all input parameters and features, and therefore relationships can have higher dimensionality. ANNs may improve the ability to implicitly detect complex nonlinear relationships between dependent and independent variables. ANNs may also improve the ability to detect all possible interactions between input parameters and features.

Some embodiments of the present disclosure may use variants of ANNs including deep neural networks and shallow neural networks. In some cases, deep neural networks may not depend on the generation of second order (e.g., derived) features and may learn implicitly from raw data features. Deep neural networks may be less interpretable for a user but consider possible interactions. On the other hand, shallow neural networks may include second order features that are predetermined by domain knowledge. Shallow neural networks may be more interpretable but at the cost of being simpler models with fewer interactions.

As used herein, the terms 'device', 'personal care device', 'instrument', 'implement', and 'tool', may be used interchangeably. 'Stroke count' may refer to the number of strokes, such as shaving strokes, in a single use. 'Orientation' may refer to vertical and horizontal position changes and duration of the instrument, tool, or implement, such as a razor, and observed trends in handle grip during use (such as during shaving). 'Temperature' may refer to the temperature of the instrument, tool, or implement, such as a razor and its components during use. 'Duration' may refer to a typical amount of time the consumer spends using an instrument, tool, or implement. 'Shave duration' may refer to a typical amount of time the consumer spends on a single shave. 'Force' may refer to the amount of pressure applied to the face or body while using an instrument, tool, or implement, such as during grooming or shaving and the amount of drag across the surface. 'Pivot measurement' may refer to the angle of the implement's head (that engages the face or body) to handle (that is held by the user) during personal care or grooming, such as a razor head to handle during a shave. 'Rinse duration' may refer to the amount of time spent under a stream of water from a sink, bath or shower. 'Date and Time of Grooming' may refer to the date and time and time history of use of the grooming instrument, tool or implement. 'Date & Time of Shave' may refer to date and time history of shaves, a record of trends in day of week and time of days shaves normally happened for the user. 'Count' may refer to the number of times an implement, tool or instrument is used over a specific period, either daily, weekly, monthly, etc. 'Shave count' may refer to the number of shaves over a specific period, and by way of example, either monthly or weekly. 'Geographic location' may refer to 'Geotagged' history of consumer personal care or grooming such as shaving while at home and travelling.

As used herein, processed data may include: date, duration, stroke count (obtained from force and/or IMU sensors), rinse count (obtained from head capacitance sensor), total rinse time, ambient temperature, minimum, maximum, and/or average force, number of strokes in each orientation (e.g., vertical up, vertical down, horizontal) and/or a force histogram of strokes. Processed data may further include: strokes (e.g., start index, end index, maximum force, gravity axis), analysis graphs and/or filtered data.

As used herein, processed shave data may include: shave date, shave duration, stroke count (obtained from force and/or IMU sensors), rinse count (obtained from head capacitance sensor), total rinse time, ambient temperature, minimum, maximum and average force, number of strokes in each orientation (e.g., vertical up, vertical down, horizontal) and/or a force histogram for the strokes. Processed shave data may further include: strokes (e.g., start index, end index, maximum force, gravity axis), analysis graphs and/or filtered data.

FIG. 1 shows an example of a system for personal care and/or grooming according to aspects of the present disclosure. The example shown includes user 100, device 105, communications network 110, storage 115, server 120, and artificial neural network (ANN) 125.

A user may use a personal care device and/or grooming device (instrument, implement, or tool) such as the device 105. In the illustrated example, the device 105 is a razor configured to shave or to perform other grooming activities, but may include, for example, trimmers, derma-planing instruments, facial body brushes and scrubbers, water picks, dental cleaning tools, toothbrushes, etc. The device 105 may communicate with the server 120 through the communications network 110. The communications network 110 may include communication networks such as mobile networks, wireless networks, and internet. The server 120 may include an ANN 125. In some embodiments of the present disclosure, the ANN 125 may be trained using data from a plurality of sensors.

For example, the device 105 may be a training device that provides data (d) from its (n) sensors (where n is an integer) to train a machine learning algorithm to determine one or more shave characteristics. The device 105 may, however, be a production device that provides less data (e.g., d−1) from the n sensors and/or from less sensors (e.g., n−1) to allow the machine learning algorithm (e.g., that has been trained) to predict the one or more shave characteristics specifically for the production razor. Thus, for example, the ANN 125 may predict one or more shave characteristics based on input data to indicate, for example, the device 105 end-of-life information. In another example, the ANN 125 may predict feedback information related to brushing teeth, drying hair, or any other personal grooming process based on a type of device utilized (e.g., toothbrush, etc.), input data, etc.

The device 105 may be an example of, or include aspects of, the corresponding element or elements described with reference to FIG. 2.

The communications network 110 may include networks such as mobile networks, wireless networks, internet or any combination thereof. According to some embodiments of the present disclosure, information on the device 105 (e.g., sensor data) may pass through the communications network 110 and may be collected by the ANN 125 of the server 120.

One embodiment of the present disclosure establishes a communication link between a hub and an off-the-shelf personal care or grooming device, such as a razor, with an inertial measurement unit (IMU) (or a sensor suite sufficient to collect information necessary for the determination) or an implement which is configured to generate raw use data. The communication link may be a BT link. Other communication interfaces are possible. The communication link may be encrypted (e.g., one way, two way, etc.).

The storage 115 may be an example of, or include aspects of, the corresponding element or elements described with reference to FIGS. 3, 7, and 9.

Figure 6:
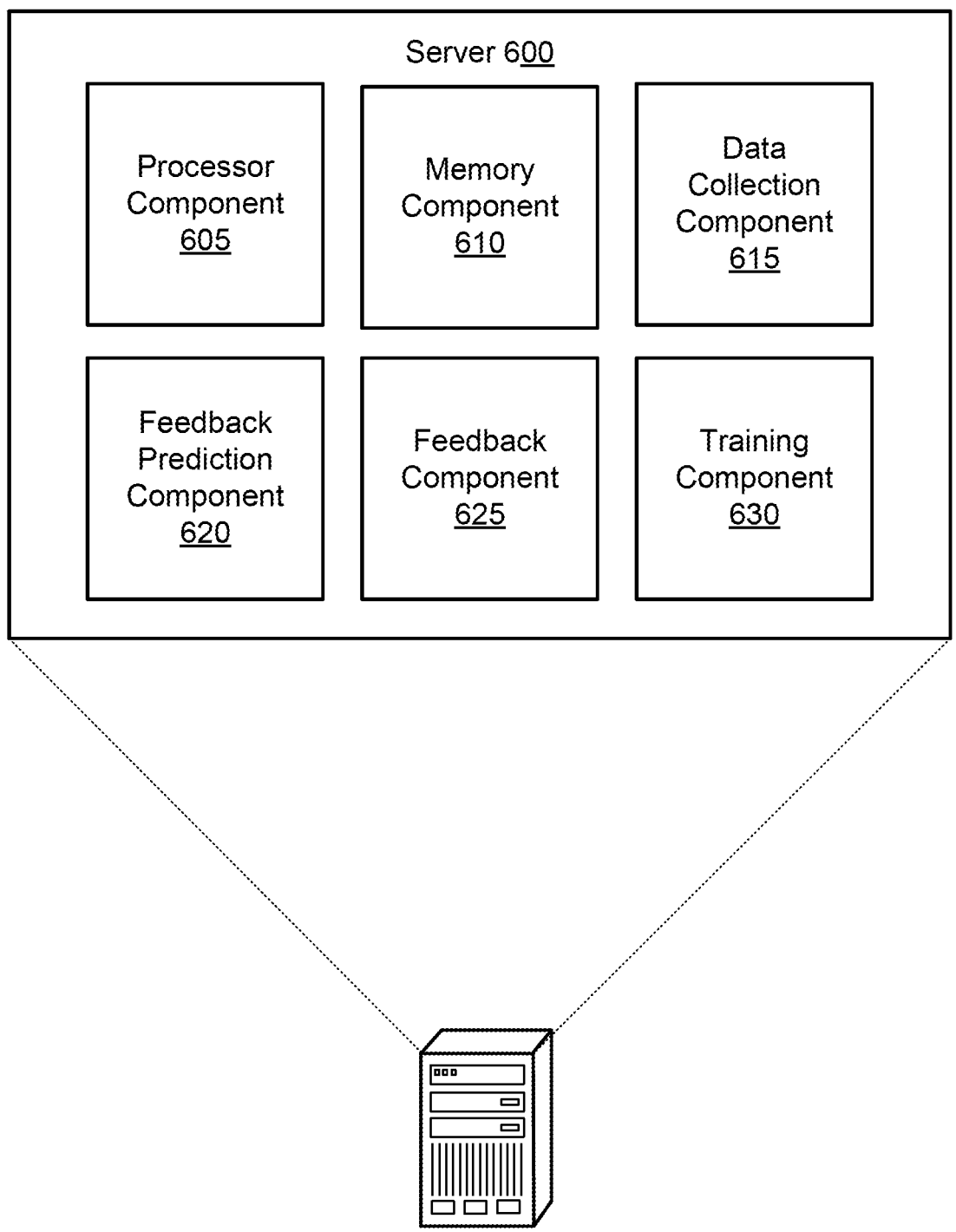
FIG. 6 shows an example of a feedback server for a personal care system according to aspects of the present disclosure.

The server 120 may be an example of, or include aspects of, the corresponding element or elements described with reference to FIGS. 6 and 8. The server 120 may use machine learning techniques such as the ANN 125 to identify input data from sources (e.g., sensor data), predict one or more features, such as shaving features, based on the input data, and provide feedback, and for example, shaving feedback, such as cartridge replacement and/or notification(s), device 105 end-of-life information, etc. One embodiment of the present disclosure is a feedback server 600, as illustrated by FIG. 6. The feedback server 600 may train a machine learning model that provides feedback, such as shaving feedback, based on one or more features, such as shaving features. In another embodiment, a sensor reduction server 800 may train a machine learning model that predicts one or more shaving features using data from a subset of sensors.

The ANN 125 may be an example of, or include aspects of, the corresponding element or elements described with reference to training component 630, 835 of FIGS. 6 and 8, respectively. An artificial neural network (ANN) may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

The ANN 125 may consider first order features including all raw sensor data features. The ANN may also consider second order (e.g., derived) features. The second order features (e.g., derived) may include more interpretable features from raw sensor data. The ANN 125 may include deep and shallow learning models. The ANN 125 may determine shave length from IMU sensor data. For example, the ANN 125 may use acceleration and time data to calculate length of use for a personal care or grooming routine, such as length of shave.

In some cases, the feedback predicted by the ANN 125 may be based on shaving a particular region of the body (i.e., face, legs, or other body part). Shave length may be used as a predictor of the device 105 end-of-life. Machine learning models, methods and systems may use input data and features that are indicative of end-of-life, and sensors that produce the most valuable data.

Some embodiments may use deep learning architectures including deep neural networks (DNNs) and recurrent neural networks (RNNs). In one embodiment of the present disclosure, a force prediction recurrent neural network (RNN) may be used. An RNN is a multi-layer perceptron that learns how to process data over time. The RNN may be designed to learn how to manage memory of time series data. Filtered sensor data may be processed as input data to the RNN. In some cases, RNN may process fixed length time series sensor data. Fixed length time series sensor data may come from IMU data and capacitive sensor data, or may come from IMU data only. The RNN may output the perceived force over the fixed length input. Notably, IMU data may be the most significant indicator of force as shown by calculations of the mean absolute error (average difference between the predicted value and the target value). A first model, using IMU data and capacitive sensor data, and a second model, using IMU data only, may be improved over multiple epochs (e.g., 50, etc.) of training (e.g., lower error). Thus, for example, a force sensor may be unnecessary in a sensor configuration.

According to an embodiment, a dense neural network may be a multi-layer perceptron that performs similarly to a logistic regression model. A DNN may be designed to learn meaningful combinations of input features. Second order features may be processed as input to the DNN.

One embodiment of the present disclosure describes a network architecture for learning. The architecture may be a stacked Long Short-Term Memory RNN. Long Short-Term Memory (LSTM) networks are a type of recurrent neural network capable of learning order dependence in sequence prediction problems. LSTMs may be designed to learn how long to hold on to each data point. The width (number of nodes) and depth (number of layers) may be increased to trade off speed for accuracy. The width and depth of a neural network are typically tuned to the size and complexity of a dataset. For example, experiments are conducted on a dataset relating to a grooming instrument, tool or implement, such as the device 105. For this dataset, diminishing returns in accuracy may occur with greater than 2 layers×24 nodes. Some embodiments may use a 2×50 stacked LSTM-RNN.

The LSTM-RNN may, therefore, be approximated as a function of input data together with weights and biases such as $Y=F(X,W,B)$. Input data may, for example, be passed through the LSTM-RNN consisting of a neural network initialized with a certain width and depth. In one example, a number of nodes and/or of links connecting nodes between layers decreases as the network is traversed from an input to an output of the LSTM-RNN. For example, each node at an initial or input layer may have a link to each node in an immediately succeeding layer while a single node at a final or output layer may have only two input links from two respective nodes in an immediately preceding layer.

Moreover, each point or channel of input data may be weighted with the same or different weight and biased with the same or different bias. For example, where input data (X) is passed through a model (F) and model output (Y) is optionally compared to expected output data (Ygt), weights (W) and biases (B) at time 0 may be randomly initialized numerical values close to 0.0, selected by a Glorot Uniform initialization algorithm. Additionally or alternatively, IMU x-acceleration data at time 1 may be weighed with a weight ($W_1$) and biased with a bias (B), IMU z-gyroscope data at time 1 may be weighed with a weight ($W_6$) and biased with the same or different bias (B(n)), and so on, wherein each bias value may be independently maintained and updated during training. Initial and updated parameters, such as width, depth, links, weights and/or biases, may be based on a use feature to be predicted (e.g., weights and/or biases used may differ to train a model for force compared to a model for distance travelled). In addition, while pre-processing (e.g., filtering, etc.) and processing of data (e.g., training, etc.) may occur on a single data point (or channel) the same steps may be accomplished on a window or collection of data that can be sequential or overlapping. For example, IMU x-acceleration data at time 1 can be used or five points of IMU x-acceleration data at time 1-5 can be used. Reference data would correspond to the same temporal window as the input data.

During training, output data of the model may then be compared to reference data to determine a % error and/or confidence level from the comparison between the model output data (Y) and reference data (Ygt). When the % error or confidence level is unacceptable (e.g., based on a threshold value), the weights and biases may be adjusted and the input data may again be passed through the updated LSTM-RNN to determine if an acceptable % error and/or confidence level has been reached. The process may iteratively be executed until an acceptable % error and/or confidence level is achieved with a trained machine learning model that produces the lowest or tolerable error. Thus, in one example, the variables Y,X,W,B may be represented as tensors in computer memory or storge, which may refer to an N-dimensional collection of numerical data (e.g., normalized and scaled between [0,1] or [−1,1]). Meanwhile, the error (e.g., loss) may refer to an average computed mean squared difference between model output data (Y) and reference data (Ygt). A learning algorithm (e.g., Adam Optimizer) may, therefore, take as input the computed loss and determine the direction and magnitude with which to adjust each weight and bias of the training model.

An evaluation of the trained model may also be performed to confirm repeatability before the model architecture is selected that produces the lowest or tolerable error. For example, a total set of training data may be divided so that a relatively small portion of the training data is used for evaluation and not training. The relatively small portion of training data is passed through the candidate trained LSTM-RNN and compared to the reference data to evaluate the error or confidence for a particular use feature (e.g., average error for cumulative force across all shaves, average error from total distance traveled across all shaved, etc.). The trained machine learning model may then be deployed to predict use features and/or to enhance functionality using production input data (e.g., substantially real-time while using a device). In this regard, a use feature may be predicted from a subset of sensors (e.g., using IMU data only) and a personal care device such as, for example, the device 105, may exclude, disable, and/or or not require a traditional sensor to identify, derive, or predict that use feature.

In one example to train a model for a prediction of force, the input training data passed through the LSTM-RNN consists of time series IMU data only (e.g., acceleration (x,y,z) and gyroscope (x,y,z)) from a personal care device such as, for example, the device 105, and the reference data consists of sensor data such as, without limitation, time series force data such as force applied to head from a force sensor of the personal care device. When an acceptable % error and/or confidence level is achieved for force using IMU data only, a personal care device such as, for example, the device 105, may exclude, disable, and/or or not require the force sensor to provide the usage feature (e.g., cumulative force, etc.). The predicted use feature of force may then, in turn, be used to predict other use features and/or enhance the user experience including providing recommendations, control functions, replenishment, etc., by passing production input data through the deployed trained machine learning model.

In another example to train a model for a prediction of distance traveled, the input training data passed through the LSTM-RNN consists of time series IMU data only (e.g., acceleration (x,y,z) and gyroscope (x,y,z)) from a personal care device such as, for example, the device 105, and the reference data consists of corresponding time series data obtained using a six degree of freedom (6DoF) tracking solution coupled with the personal care device (e.g., via a serial connection). The data from the tracking solution may be transformed to a measure of actual distance traveled. In one example for 146 second time series data, the true distance was 4178.22 cm and the predicted distance was 4252.33 cm which provided an error percent of 1.77%. Notably, the trained machine learning model may provide an average error of 2.79% for a prediction of total distance traveled by the personal care device. The predicted use feature of distance travelled may then, in turn, be used to predict other use features and/or enhance the user experience including providing recommendations, control functions, replenishment, etc., by passing production input data through the deployed trained machine learning model.

In yet another example to train a model for a prediction of work performed by a personal care device, the input training data passed through the LSTM-RNN consists of time series IMU data only (e.g., acceleration (x,y,z) and gyroscope (x,y,z)) from a personal care device such as, for example, the device 105, and the reference data consists of a combination of sensor data such as, without limitation, time series force data such as force applied to head from a force sensor of the personal care device and corresponding time series data obtained using a 6DoF tracking solution coupled to the personal care device (e.g., via a serial connection). However, work performed by a personal care device may be determined using an arithmetic logic unit (ALU) or other processor configured to multiply the independently predicted force and predicted distance travelled. The predicted use feature of work may then, in turn, be used to predict other use features and/or enhance the user experience including providing recommendations, control functions, replenishment, etc., by passing production input data through the deployed trained machine learning model.

Notably, data preparation may include clock synchronization between the sensor data and the reference data using corresponding signals in the two data streams for each channel of data (e.g., IMU z-acceleration data and corresponding reference z-position data from a tracking device, etc.). For example, a signal in the IMU data may be matched to a signal in the reference data to eliminate the temporal offset and align the two data sets. In one example, the same time offset used to synchronize one channel is applied to all data channels for the same dataset. Thus, the clock may be synchronized between the data sets (e.g., for each of 100 shaves) by eliminating the offset between the data sets. However, each sensor platform may utilize its own internal time clock synchronized to the same external computing platform operating system. This type of synchronization may render a tolerable, although relatively higher, error rate of prediction for distance travelled from a model configured to use IMU data as an input for a prediction of distance traveled (e.g., during a shave, etc.) by passing production input data through the through the deployed trained machine learning model. Additionally or alternatively, periods of inactivity longer than a predetermined period (e.g., 5 seconds, etc.) in the reference data may be removed and the remaining periods of activity may be split out into subsets. Similar to the clock synchronization, the remove-and-split may be applied to all data channels from the same dataset.

Accordingly, an algorithm to predict any use feature may generally be substantially similar with differences based on a specific use feature to be predicted. For example, the general algorithm to predict any use feature may comprise requirements definition, data collection, data preparation, model development (e.g., model selection, model training, model optimization), model evaluation, and/or model deployment. Meanwhile, differences of the general algorithm may include data collection differences (e.g., different subset of data used for training, such a 6DoF motion data not required to train force measurement model), data preparation differences (e.g., force may be computed over a single timestep (10 ms) while distance may be computed at each overlapping window of 128 timesteps (1280 ms)), model differences (e.g., the values of selected hyperparameters (model architecture) and learned parameters (weights and biases) may be unique to each model), and so on.

The components of a system, such as a razor system, will now be described followed by example applications of the system. It is understood that the razor system is shown for the purpose of illustration and one or more aspects of the razor system may implemented by any system (e.g., toothbrush system, etc.), apparatus (e.g., personal care device, hub, server, IoT device, etc.), and/or method (e.g., feature prediction, etc.) according to embodiments.

Figure 2:
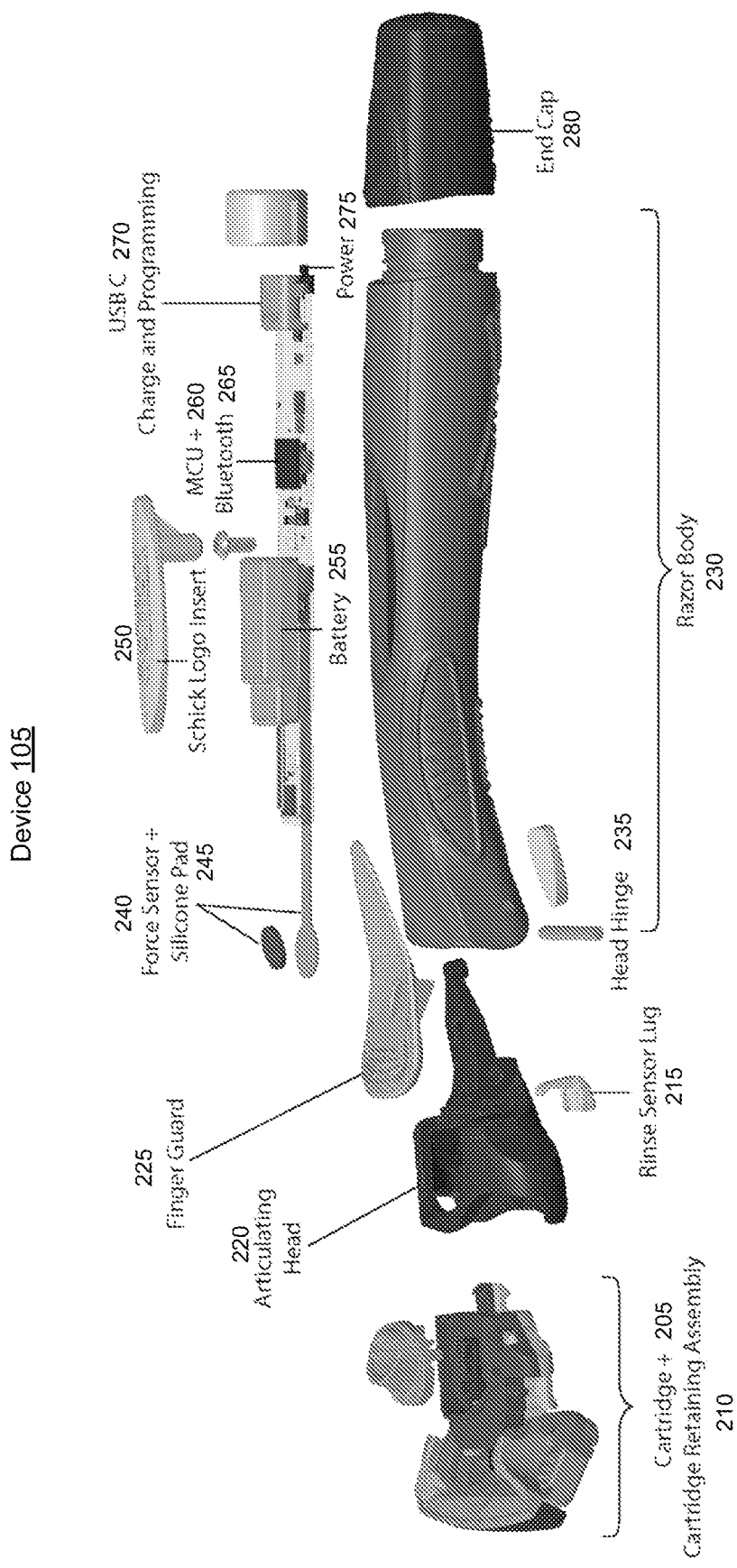
FIG. 2 shows an example of a razor according to aspects of the present disclosure.

FIG. 2 shows an example of a device 105 according to aspects of the present disclosure. Device 105 may be an example of, or include aspects of, the corresponding element or elements described with reference to FIG. 1.

Device 105 may include cartridge 205, cartridge retaining assembly 210, rinse sensor lug 215, articulating head 220, finger guard 225, razor body 230, head hinge 235, force sensor 240, silicone pad 245, logo insert 250, battery 255, micro controller unit (MCU) 260, Bluetooth or WiFi 265, a charging and/or data transmission port such as a USB or USB C port 270, power supply 275, and end cap 280. Force sensor 240, battery 255, and MCU 260 may be examples of, or include aspects of, the corresponding element or elements described with reference to FIG. 3.

In an embodiment, an interactive razor, such as the device 105 in FIG. 1, may have a plurality of sensors and some of the sensors may be removed. For example, the force sensor 240 may be removed and the device 105 may still be used to accurately predict stroke count, classify stroke direction (e.g., horizontal, vertical up, vertical down, etc.). In one example, a trained model architecture may be selected for a prediction of force such that input production data (e.g., while a user shaves) passed through a LSTM-RNN consists of time series IMU data only (e.g., acceleration (x,y,z) and gyroscope (x,y,z)) to accurately predict force. As illustrated in FIGS. 2 and 3, in an embodiment, the capacitive sensor 325 may be removed and the device 105 may still be removed to accurately classify rinses. In another embodiment, shave length may be determined from IMU sensor 320 data. For example, IMU sensor 320 may capture and/or provide acceleration and time data to calculate shave length. In one example, a trained model architecture may be selected for a prediction of distance traveled such that input production data (e.g., while a user shaves) passed through a LSTM-RNN consists of time series IMU data only (e.g., acceleration (x,y,z) and gyroscope (x,y,z)) to accurately predict distance travelled. In some embodiments, shave length may be used as a predictor of end-of-life. In yet another example, a trained model architecture may be selected for a prediction of work such that input production data (e.g., while a user shaves) passed through a LSTM-RNN consists of time series IMU data only (e.g., acceleration (x,y,z) and gyroscope (x,y,z)) to accurately predict work. However, work performed may be determined using an ALU or other processor configured to multiply the independently predicted force and predicted distance travelled.

Thus, FIG. 2 illustrates components of a razor according to an exemplary embodiment of the inventive concept. The razor in FIG. 2 is an example implementation. In other words, the razor may include more or fewer components than those shown in FIG. 2.

Figure 3:
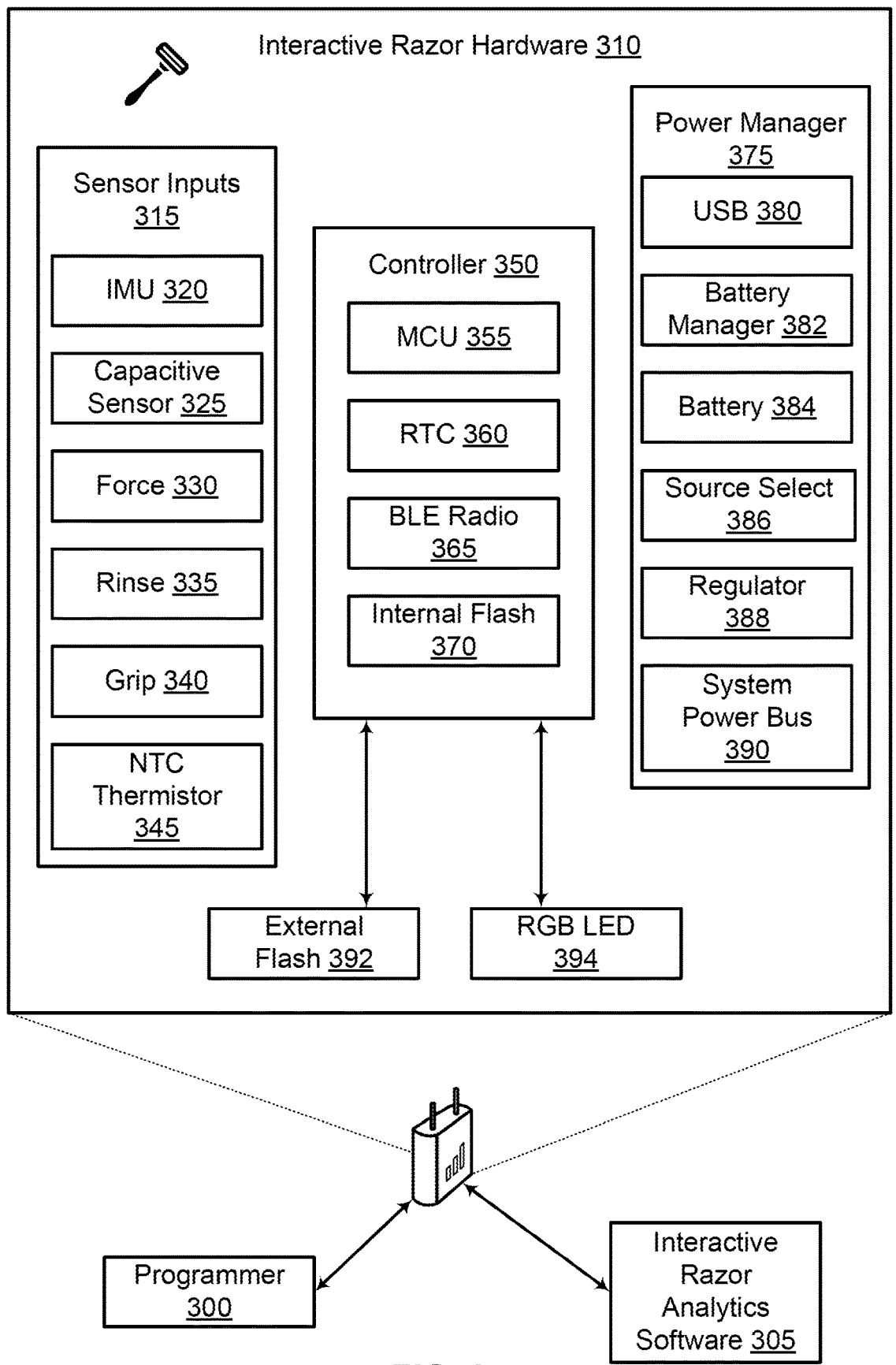
FIG. 3 shows an example of interactive razor hardware according to aspects of the present disclosure.

FIG. 3 shows an example of interactive razor hardware 310 according to aspects of the present disclosure. The example shown includes programmer 300, interactive razor analytics software 305, and interactive razor hardware 310. It is understood that the razor is hardware is shown for the purpose of illustration and one or more aspects of the razor hardware may implemented by any system (e.g., toothbrush system, etc.), apparatus (e.g., personal care device, hub, server, IoT device, etc.), and/or method (e.g., feature prediction, etc.) according to embodiments.

Interactive razor hardware 310 may include sensor inputs 315, controller 350, power manager 375, external flash 392, and RGB LED 394. Sensor inputs 315 may include inertial measurement unit (IMU) 320, capacitive sensor 325, force 330, rinse 335, grip 340, and NTC thermistor 345. Controller 350 may include MCU 355, RTC 360, BLE Radio 365, and internal flash 370. MCU 355 may be an example of, or include aspects of, the corresponding element or elements described with reference to FIG. 2.

Power manager 375 may include USB 380, battery manager 382, battery 384, source select 386, regulator 388, and system power bus 390. Battery 384 may be an example of, or include aspects of, the corresponding element or elements described with reference to FIG. 2.

As illustrated in FIGS. 2 and 3, according to some embodiments, the force sensor 240 may be removed and the device 105 in FIG. 1 may, for example, still be used to predict stroke count, classify stroke direction (e.g., horizontal, vertical up, vertical down, etc.). The capacitive sensor 325 may be removed and the device 105 in FIG. 1 may, for example, still be used to classify rinses. In another embodiment, shave length may be determined from IMU sensor 320 data. For example, IMU sensor 320 may capture and/or provide acceleration and time data to calculate shave length. In some embodiments, shave length may be used as a predictor of end of life.

Thus, FIG. 3 illustrates hardware for a razor according to an exemplary embodiment of the inventive concept. As shown in FIG. 3, the razor's hardware includes, among others, the sensor inputs 315, the controller 350 which may be a 2.4 GHz wireless microcontroller (e.g., CC2640R2) supporting BLE and the power manager 375.

As shown, the sensor inputs 315 may include, but are not limited to, the inertial measurement unit (IMU) 320, a capacitance-to-digital converter, the force sensor 330, the rinse sensor 335, the grip sensor 340 and a temperature sensor (e.g., the NTC thermistor 345). The IMU 320 may include an accelerometer, a gyroscope and/or a magnetometer, for example. An IMU, such as the IMU 320, may include at least one accelerometer per axis for three axes and/or at least one gyroscope per axis for the three axes. For example, the IMU 320 may include six micro-electromechanical-systems (MEMS) modules where one of the MEMS modules corresponds to one accelerometer or gyroscope per axis (e.g., x,y,z axes, perpendicular axes, orthogonal axes, etc.).

Preferably, an IMU lacks a magnetometer, includes a magnetometer that is disabled, and/or includes a magnetometer that has its data disregarded or otherwise filtered to prevent its data from reaching an analog-to-digital converter, a hardware register, memory, storage, a processor, a machine learning model to be trained or that is trained, or combinations thereof. In one example, a filter may include a bandpass filter. Moreover, an IMU may include a processor physically coupled to an accelerometer, a gyroscope and/or a magnetometer. For example, the IMU 320 may be a module having a processor physically coupled to an accelerometer and a gyroscope (e.g., via a data connection, via an analog-to-digital converter, etc.). Additional sensors for use with the razor according to an exemplary embodiment of the inventive concept may include a resistive contact, a piezo contact microphone, a Hall effect sensor, an external camera, a strain gauge, a load cell, a reed switch, a linear variable differential transformer, etc.

The wireless microcontroller may include a main central processing unit (e.g., the MCU 355), the BLE radio 365, the internal flash memory 370 as well as other peripherals and modules (e.g., a real time clock (the RTC 360)). For example, the CC2640R2 SimpleLink™ BT microcontroller includes, among other features, a microcontroller (e.g., having a central processing unit, non-volatile memory, random access memory (RAM), cache memory), an ultra-low power sensor controller (e.g., a sensor controller engine, an analog-to-digital converter, RAM, etc.), and a radio frequency (RF) section (e.g., transceiver, RF interface, etc.), In one example, the MCU 355 may be physically coupled to an accelerometer and a gyroscope of the IMU 320 via a connection between the controller 320 and the IMU 320. The wireless microcontroller may be connected to the external flash device 392 and a light emitting element (e.g., the status RGB LED 394). The wireless microcontroller may also be connected to the programmer 300 and analytics software 305.

When the above-described razor is used to shave, raw sensor data may be collected. The raw data may be stored in non-volatile memory on the razor. In the implementation shown in FIG. 3, the raw data can be downloaded to a desktop application through a serial connection. However, as explained above, the raw data can be sent directly to the hub. The raw data communicated between the razor and hub may be encrypted. The raw data captured by the sensors may include, but is not limited to, time in seconds (e.g., UTC-0), IMU data (e.g., acceleration (x,y,z) and gyroscope (x,y,z)), force applied to head, capacitance of metal insert in head, case temperature, gravity axis (e.g., a rough orientation of the razor) and force sensing register (FSR) calibration values.

When the above-described razor is used to shave in production, or more generally when a personal care device is used to perform its function outside of a training process, a processor (e.g., one or more cores, central processing units, graphics processing units, combinations thereof, etc.) may be configured to execute a machine learning model that has been trained to predict a use feature. For example, a processor of the IMU 320 and/or the MCU 355 may be configured to execute a trained LSTM-RNN that has been selected to predict force such that input production data (e.g., while a user shaves) passed through the LSTM-RNN consists of time series IMU data only (e.g., acceleration (x,y,z) and gyroscope (x,y,z)) to accurately predict force. Additionally or alternatively, a processor of the IMU 320 and/or the MCU 355 may be configured to execute a trained LSTM-RNN that has been selected to predict distance traveled such that input production data (e.g., while a user shaves) passed through the LSTM-RNN consists of time series IMU data only (e.g., acceleration (x,y,z) and gyroscope (x,y,z)) to accurately predict distance travelled. Additionally or alternatively, a processor of the IMU 320 and/or the MCU 355 may be configured to execute a trained LSTM-RNN that has been selected to predict work performed by the razor such that input production data (e.g., while a user shaves) passed through the LSTM-RNN consists of time series IMU data only (e.g., acceleration (x,y,z) and gyroscope (x,y,z)) to accurately predict work. A processor of the IMU 320 and/or the MCU 355 may, however, also be configured to calculate work based on independently predicted force and distance travelled (e.g., work=force*distance).

Similarly, a processor of the IMU 320 and/or the MCU 355 may be configured to perform a transformation that uses a predicted use feature (e.g., predicted force, predicted distance traveled, etc.) to predict another use feature related to the personal care device such as, without limitation, stroke force (e.g., force generated on individual stroke, force generated on total strokes during a shave, etc.), stroke distance (e.g., distance travelled on individual stroke, distance travelled on total strokes during a shave, etc.), stroke count (e.g., number of strokes during a shave, total number of strokes during operation, etc.), rinse event (e.g., individual rinse of the device, number of rinse events during a shave, total number of rise events during operation, etc.), end-of-life (e.g., prediction of when one or more components remain operable, prediction of when a replacement is recommended based on a threshold value, etc.), or combinations thereof. The transformation may be achieved using a function (e.g., database, matrix, pointers, mathematical functions, etc.) that relates the predicted use feature with other use features to be predicted such as stroke count or end-of-life value. A processor of the IMU 320 and/or the MCU 355 may also execute an additional machine learning model trained to predict one or more other use features based on one or more predicted use features such as, without limitation, when a model is executed that is trained to predict stroke count or end-of-life based on predicted force (from a trained model), predicted distance traveled (from a trained model), or combinations thereof. A processor of the IMU 320 and/or the MCU 355 may, however, be configured to execute an additional machine learning model trained to predict one or more other use features (e.g., stroke count, end-of-life, etc.) based on input production data (e.g., while a user shaves) passed through the trained LSTM-RNN that consists of time series IMU data only (e.g., acceleration (x,y,z) and gyroscope (x,y,z)) to accurately predict the other use feature.

The predicted use feature may then be used to provide feedback such as control functions on the personal care device (e.g., fluid delivery, pulses, etc.), use recommendations (e.g., user guidance, etc.), control functions on IoT devices proximate to the personal care device (e.g., faucet, lighting from fixtures, etc.), replenishment functions (e.g., automatic order placement, etc.), replacement information (e.g., cartridge usage levels, etc.), or combinations thereof. For example, the predicted use feature may be used to cause flow or temperature of water from a faucet to change via an IoT faucet, to cause a recommendation related to the use of the personal care device to be communicated to the user (e.g., stroke recommendation via the personal care device, via an IoT device such as a smart mirror, via a mobile device, etc.), to cause an automatic replenishment of a disposable component of the personal care device (e.g., order a replacement cartridge, etc.), to cause a user to be notified of the predicted end-of-life for a disposable component to allow the user to change the disposable component, etc.

Accordingly, for example, a processor of the IMU 320 and/or the MCU 355 may be configured to initiate a control instruction to control an element of the personal care device. In one example, the control instruction includes an interrupt to modulate the operation of the element, an enable signal to enable the operation of the element, a disable signal to disable the operation of the element, or combinations thereof. For example, a razor device may include a cartridge having a razor blade and optionally a shaving aid composition. In addition, a razor device may include a dispenser that houses a personal care composition (e.g., shaving fluid, etc.) that can be selectively released to enhance a shave experience. In this regard, a processor of the IMU 320 and/or the MCU 355 may be configured to initiate a control instruction (e.g., generate an instruction, forward an instruction, make a call to generate or forward an instruction, etc.) to a controller coupled to the cartridge to modify how one or more components of the cartridge touch the user (e.g., blade contact, etc.) based on the predicted use feature (e.g., force, distance traveled, stroke, stroke count, etc.), The processor of the IMU 320 and/or the MCU 355 may also be configured to control the dispenser by initiating a control instruction to a controller coupled to the dispenser to selectively apply the personal care composition during a shave based on the predicted use feature (e.g., force, distance traveled, stroke, etc.).

A processor (e.g., one or more cores, central processing units, graphics processing units, etc., combinations thereof) coupled to one or more sensors (e.g., an accelerometer, a gyroscope, etc.) may also optionally be coupled to an RF interface to communicate raw data, predictions and/or feedback, memory or storage to store raw data, predictions and/or feedback, a sensor controller to control feedback based on predictions via an input/output device (e.g., a display, a speaker, a tactile device, a switch, etc.), or combinations thereof. In this regard, traditional communication connections include, without limitation, connections on a circuit board, serial connections between hardware modules, local area network connections, wide area network connections, or combinations thereof. Meanwhile, feedback signals may include, without limitation, interrupts, enable signals, disable signals, machine code instructions (e.g. assembly code, etc.), input/output device instructions, or combinations thereof.

Moreover, while a processor coupled to an accelerometer and/or a gyroscope (or an IMU) has been described as being physically coupled via a communication connection in a personal care device, the processor configured to execute one or more aspects of embodiments (e.g., a machine learning model that has been trained to predict a use feature related to the personal care device, data collection, model training, feedback, etc., or combinations thereof) may be located on one or more other devices such as a hub, a server, an IoT device, a mobile computing platform, or combinations thereof. Thus, for example, a processor may be communicatively coupled to a set of sensors (e.g., accelerometer, a gyroscope, etc.) on the personal care device via a connection between a hub and the personal care device. In another example, a processor may also be located on a server communicatively coupled to the personal care device and/or the hub proximate to the personal care device.

Figure 4:
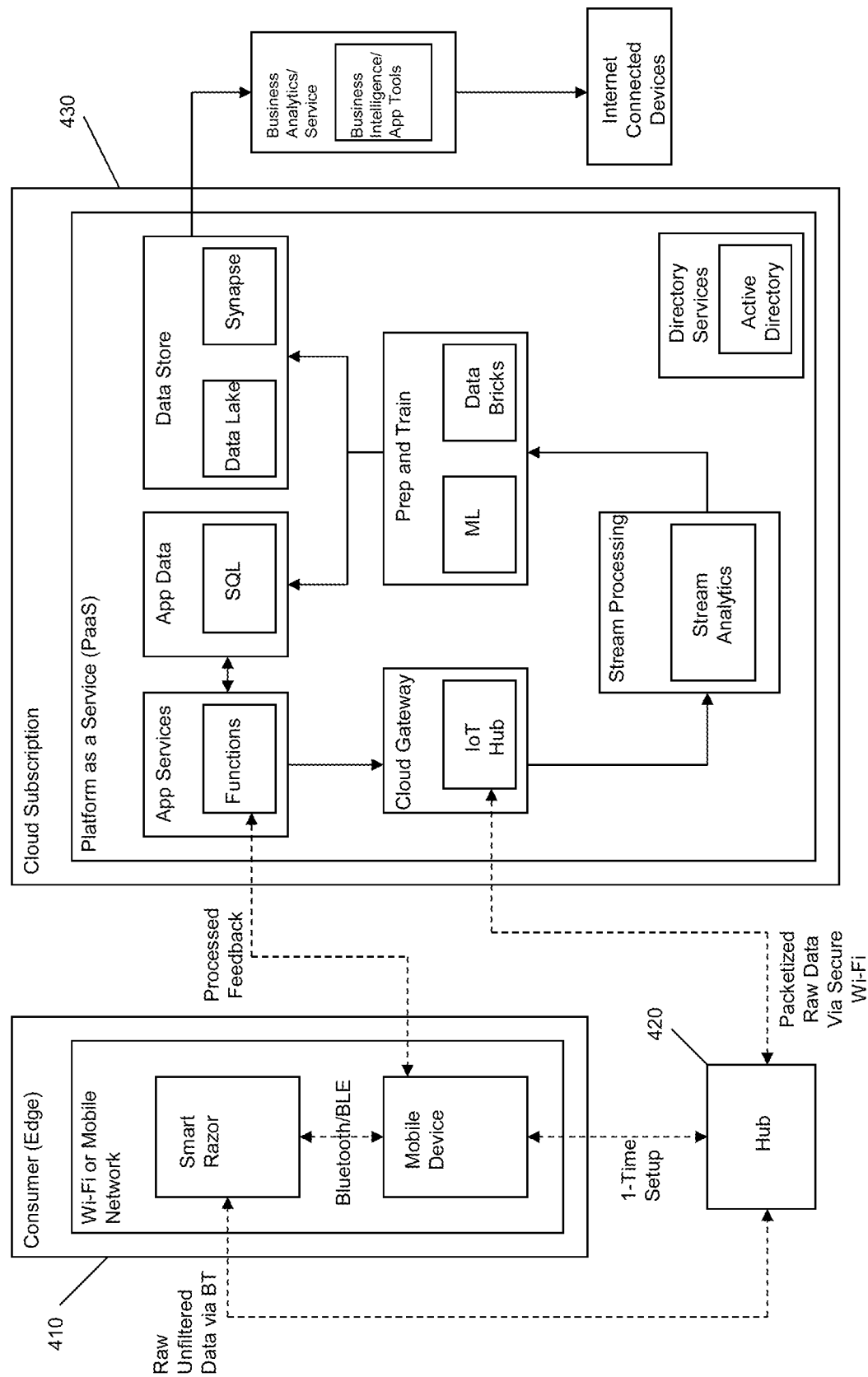
FIG. 4 illustrates architecture of an Internet-of-Things (IoT) razor system according to an exemplary embodiment of the inventive concept.

FIG. 4 illustrates architecture of the IoT razor system according to an exemplary embodiment of the inventive concept. The architecture shown in FIG. 4 is provided as an example, but embodiments of the inventive concept are not limited thereto.

As shown in FIG. 4, the IoT razor system includes a consumer component 410, a hub 420 and a cloud component 430. The consumer component 410 includes a smart razor and a mobile device. It is to be understood that the consumer component 410 may include additional devices equipped with wireless communication technology such as a smart mirror, a smart faucet or shower head, etc. The smart razor and mobile device (e.g., a smartphone) may wirelessly communicate with each via Bluetooth or Bluetooth Low Energy (BLE). It is to be understood that various other short-range wireless communication techniques may be employed by the smart razor and mobile device including but not limited to ZigBee, Near-field communication (NFC), Li-Fi, Ultra-wide band (UWB), Radio-frequency identification (RFID), etc. The smart razor may correspond to one of the razors described above with reference to FIGS. 1-3.

The smart razor wirelessly provides raw data to the hub 420 via Bluetooth or BLE, for example. As noted above, the raw data may be provided via a number of other short-range wireless communication technologies. The raw data sent from the razor to the hub 420 is data collected by sensors in the razor. The sensors and raw data will be discussed in detail later. The hub 420 stores the raw data and transmits the raw data to the cloud component 430. For example, the hub 420 may transmit the raw data via dedicated and secure IP protocols to the cloud component 430. More specifically, the raw data may be sent to a dedicated IP address of a server in the cloud (e.g., a cloud computing network) via a long-range connection (e.g., cellular connection, fiber optic connection, copper connection, etc.).

More specifically, in one embodiment, the raw data is directly provided from the smart razor to the hub 420 and then the hub 420 provides the raw data directly to a sever in the cloud. In this embodiment, no mobile device is used as an intermediary for communicating the raw data between the hub 420 and the server. In addition, no mobile device is used as an intermediary for communicating the raw data between the smart razor and the hub 420. As will be noted below, in such an embodiment, the mobile device is only used to receive information from the server. The mobile device does not receive raw razor data.

At the cloud 430, a platform-as-a-service (PaaS) provides an application gateway, e.g., the cloud gateway/IoT hub in FIG. 4, which receives the raw data and the raw data is pre-processed before being input to a model such as a neural network model, e.g., the ANN 125 in FIG. 1. The model used may correspond to one or more of the machine learning models described herein. In the stream pre-processing, force and capacitive sensor data may be passed through a Butterworth filter to flatten frequency response. In addition, the inputs to the neural network may be normalized to speed up the neural network. Furthermore, filtered force sensor values may be scaled down to mitigate exploding gradients during training.

The model uses the raw data (which may be pre-processed data) to predict a shave feature. In one example, the neural network model uses the pre-processed data to predict the end of useful life of a razor cartridge. For example, using the filtered, time-series sensor data as input, the neural network model generates an output indicating the probability of the razor's end of life. An example of the neural network model will be described in greater detail later.

The outputs of the neural network model are stored in a database, e.g., the Data Store in FIG. 4, which may include a hierarchical database, a relational database, an object-orientated database, and so forth. In one embodiment, the Data Store includes an Azure SQL database. The data output from the model may be used by the illustrated application services (App Services) to generate, deploy, and/or use an application to provide a replacement order for new razor cartridges. The outputs of the model may also be used by the application services to generate, deploy, and/or use an application to provide other feedback to the user. While not shown, any other services platform or computing device with access to the data store and/or the application data (App Data) may provide services (e.g., replacement services) and/or information (e.g., feedback) based on the predicted features. Moreover, business intelligence and/or application tools (e.g., Power Apps/BI) within a business analytics and/or subscription service platform (e.g., Microsoft 365) may utilize the data output from the model to build and/or use applications, gain insights from the data with business intelligence and/or data mining tools, make decisions, generate reports, etc.

The application services may, for example, facilitate communication with the consumer component 410 to provide information to the user. The user of the personal care or grooming implement, instrument or tool, such as a razor, may, for example, be informed that their new cartridges are on the way via a software application on the mobile device. For example, a display may provide a graphical user interface (GUI) which can allow the user to view a notification such as one or more recommendation(s), replacement order confirmation(s) and/or acceptance(s), order status, end-of-life message(s) (e.g., predicted end date, usage level, etc.), or other use information about the device or user. Any other consumer component and/or the hub 420 may, however, communicate with any services platform to receive feedback via a GUI, diodes, and/or a tactile device configured to provide information related to replenishment, feedback, etc.

Accordingly, and although the model has been described as being used to generate replacement orders for razor cartridges, it is to be understood that the model may be used for a variety of other applications. For example, the neural network model can utilize the data provided thereto to identify use habits (such as shaving habits) which can lead to customized recommendations. More specifically, the neural network can be used to generate product recommendations, product-use adjustments, an estimated number of quality uses (such as shaves) remaining indication, etc. Thus, services and/or feedback provided may be related to, for example, brushing teeth, drying hair, and/or any other personal grooming process based on a type of device utilized (e.g., tooth brush, etc.), training, sensor configuration, input data, use parameter/feature/metadata, etc., or combinations thereof. These additional features and other aspects of FIG. 4 will be further discussed in detail later. Moreover, the illustrated PaaS is one non-limiting embodiment of a cloud infrastructure. Thus, for example, one or more other infrastructures such as an infrastructure-as-a-service (IaaS), software-as-a-service (SaaS), etc., may be additionally or alternatively be implemented. Similarly, one or more aspects of the cloud 430 may additionally or alternatively be implemented in a non-cloud computer network such as, for example, an on-premises or in-house computer network.

Figure 5:
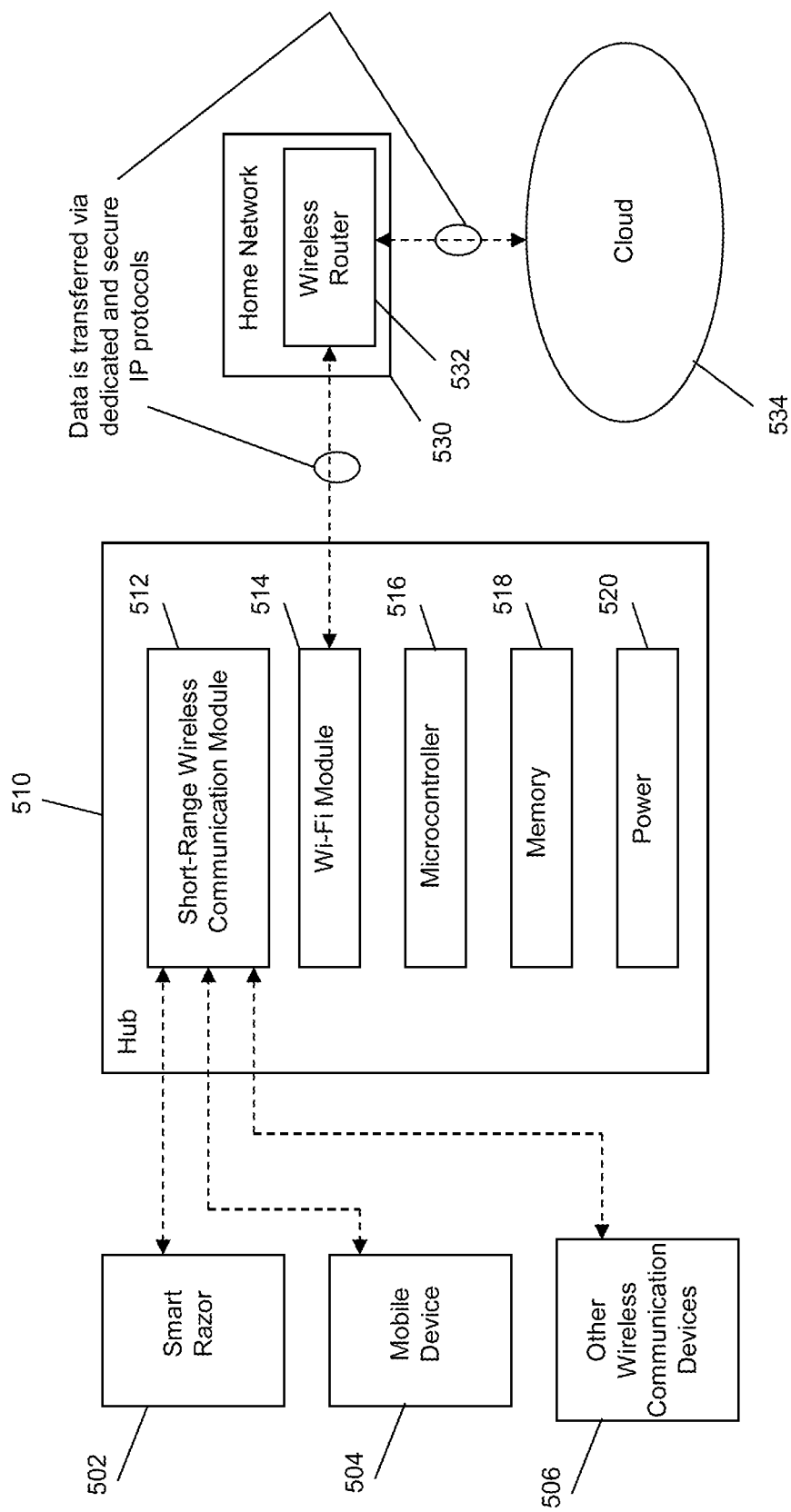
FIG. 5 illustrates a hub according to an exemplary embodiment of the inventive concept.

FIG. 5 illustrates a hub 510 according to an exemplary embodiment of the inventive concept. As shown in FIG. 5, the hub 510 includes a short-range wireless communication module 512, a Wi-Fi module 514, a microcontroller 516, a memory 518 and power 520.

The short-range wireless communication module 512 may employ Bluetooth or BLE. It is to be understood that various other short-range wireless communication techniques may be employed by the hub 510 including but not limited to ZigBee, NFC, UWB, RFID, etc. The short-range wireless communication module 512 enables the hub 510 to communicate with other nearby devices such as the smart razor 502, the mobile device 504 or other wireless communication devices 506 such as a smart mirror, a smart faucet or shower head, lights, a thermostat, etc. In accordance with an exemplary embodiment of the inventive concept, communication via the smart device (such as a razor 502) and hub 510 may be encrypted. For example, the smart device (such as a razor 502) and hub 510 may be paired using Secure Simple Pairing (SSP) to establish a BLE link and, once paired, encrypted raw data may be transmitted via the BLE link.

Data sent from the device (such as a razor 502) to the hub 510 may be stored in the hub's memory 518. The hub 510 may receive data from the device (such as a razor 502) in real-time while a user is shaving. The transfer of data may be in response to a request from the hub 510. For example, the microcontroller 516 of the hub 510 may be configured to periodically request the device (such as a razor 502) to transmit raw data stored in its onboard memory. The periodic data request may be based on time of day (TOD), etc.

The Wi-Fi module 514 enables the hub 510 to communicate with a wireless home network 530, for example. It is to be understood that the hub 510 may include any other communication interface that enables it to communicate with a network. For example, the hub 510 may include a module that enables power-line communication (PLC).

The hub 510 may send the raw data to a server in the cloud 534 via the wireless router 532. The data may be sent to the cloud 534 in real-time as it is received from the device (such as a razor 502). In addition, the hub 510 may queue the data and forward it to the cloud 534 after a predetermined period of time, after a predetermined amount of data has been collected, at a specific time of day, etc. These forwarding times may be set by a user via an application on their mobile device. The transfer of data may also be in response to a request for data from the cloud server. These data requests may be sent after a predetermined period of time, after a predetermined amount of data has been collected, at a specific time of day, etc.

Communication between the hub 510 and the cloud server is secure. For example, all raw data provided from the hub 510 to the server may be encrypted. Further, any communications from the server to the hub 510 may be encrypted. More specifically, the raw data may be transmitted via a secure channel existing between the hub 510 and the cloud server. The secure channel may employ one of the following protocols Advanced Message Queuing Protocol (AMQP), Message Queuing Telemetry Transport (MQTT), Hypertext Transfer Protocol Secure (HTTPS), for example. Simple Authentication and Security Layer (SASL) may be used for authentication and data security between the hub 510 and cloud server.

The hub 510 may include its own power source such as a battery, rechargeable or not. In addition, the hub 510 may include a USB connector for power or the hub may utilize inductive charging. The USB connector may double as a data store. The hub 510 may also include a plug that plugs into a power receptacle. As shown in FIG. 5, the hub 510 is a standalone device similar to an Ethernet bridge. The hub 510 may plug into a power receptacle so, for example, a user can take the hub 510 on trips. In one example, the hub 510 may have a substantially cube-shaped wall adapter form factor with built-in power prongs. The hub 510 may also be configured as a receptacle device for the implement, such as a shave implement. For example, the hub 510 may be a dock, stand, or a cradle. In this case, hub 510 could be used to charge the device (such as a razor 502), clean or sterilize the device (such as a razor 502) as well as assess the device for faults and/or deterioration.

FIG. 6 shows an example of a feedback server 600 for a personal care system according to aspects of the present disclosure.

Server 600 may be an example of, or include aspects of, the corresponding element or elements described with reference to FIGS. 1 and 8. Server 600 may include processor component 605, memory component 610, data collection component 615, feedback prediction component 620, feedback component 625, and training component 630.

The processor component 605 may be an example of, or include aspects of, the corresponding element or elements described with reference to FIG. 8. A processor may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

The memory component 610 may be an example of, or include aspects of, the corresponding element or elements described with reference to FIG. 8. A computer memory may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

The data collection component 615 may identify data from a razor (e.g., one example of the device 105 in FIG. 1) that includes a set of sensors. The data collection component 615 may be an example of, or include aspects of, the corresponding element or elements described with reference to FIG. 8. In some examples, therefore, the set of sensors may include an IMU 320, a capacitance-to-digital converter, a force sensor 240, a rinse sensor 335, a grip sensor 340, a temperature sensor, an accelerometer, a gyroscope a magnetometer, a resistive contact, a piezo contact microphone, a Hall effect sensor, an external camera, a strain gauge, a load cell, a reed switch, a linear variable differential transformer, or any combination thereof. The data collection component 615 may also receive data via a wireless communications connection to the razor.

In one embodiment, the data collection component 615 collects data from a set of sensors on a device (e.g., a razor) such as the device 105 in FIG. 1. In some embodiments, the data collection component 615 may identify and collect other data through means such as user participation, survey, personal subjective opinion, etc. In an example, participants shave periodically with a same cartridge using a razor (e.g., one example of the device 105 in FIG. 1) until they indicate the cartridge no longer provides an effective shave experience. Participants may answer survey questions after each shave regarding their subjective opinion on their shave experience. Thus, the data collected by data collection component 615 may include sensor data from the device 105 illustrated in FIG. 1 (e.g., 60 Hz, 120 Hz, etc.) and/or hedonic survey data about shave experience (also may be referred to as SIMS data). In addition, a longevity shave test may include executing two separate trials (e.g., A and B). Trial A may be limited to 30 days and Trial B may not be limited in terms of duration. Both trials may include 26 unique participants and same participants are present in each trial.

In one embodiment, the data collection component 615 collects data from a set of sensors on a personal care device (e.g., the device 105 in FIG. 1) other than a razor. For example, participants may brush teeth or perform any other personal grooming activity until they indicate the device no longer provides an effective experience. Participants may answer survey questions after each session regarding their subjective opinion on the experience.

In one example, ground truth data may be collected from a razor (or other shaving implement) having a plurality of sensors (e.g., accelerometer, gyro, magnetometer, image capture device, Hall effect sensor, piezoelectric sensor, etc.), such as the device 105 in FIG. 1. The ground truth data may be captured by the sensors of the razor as a user, such as the user 100 in FIG. 1, utilizes the shave implement. The ground truth data may be compiled data from the sensors. Thus, the ground truth data may include information that is unnoticeable or undetectable to the human eye (e.g., slight movements, slight variances in each types of movements, multiple combinations of types of movements, various movements captured simultaneously real-time, etc.). In another embodiment, the ground truth data may include datasets having data from an accelerometer, a gyro, a Hall effect sensor, etc.

In an embodiment of the present disclosure, the data collection component 615 may comprise data cleanup, integrity check (e.g., garbage in/garbage out), feature engineering and extraction. Input data may be multiple subsets of filtered, time series sensor data. In another embodiment, a learning model may be developed through creating a neural network, wherein input data are derived sensor data features (e.g. cumulative force, distance travelled, time under force) and output data are probability of razor end of life.

In some embodiments, processed data may include shave date, shave duration, stroke count (from force and IMU sensors), rinse count (head capacitance sensor), total rinse time, ambient temperature, minimal, maximal, and average force, number of strokes in each orientation (e.g., vertical up, vertical down, and horizontal), and force histogram for strokes. Additional processed data may include strokes (e.g., start index, end index, max force, gravity axis), analysis graphs, and filtered data.

In some embodiments, processed data may include information related to a personal grooming activity other than a shave, such as the date, duration, stroke count (from force and IMU sensors), rinse count (head capacitance sensor), total rinse time, ambient temperature, minimal, maximal, and average force, number of strokes in each orientation (e.g., vertical up, vertical down, and horizontal), and force histogram for strokes other than shave strokes (e.g., brush strokes for a toothbrush).

Referring to feature engineering, potential second order (derived) features may include determining the start and end of a stroke or rinse event, shave characteristics, average force per stroke, cumulative force applied for life of razor, cumulative duration usage for life of razor, wall time between shaves, survey response deltas (i.e., differences among respondents for survey data normalization), shave length or distance travelled, and amount of work for life of razor.

In an embodiment of the present disclosure, determining the start and end of a stroke or rinse event may use data limited to this period for better metrics. In some cases, use characteristics, such as shave characteristics, may include stroke count, stroke direction (e.g., horizontal, vertical up, vertical down), and rinse count. In an embodiment, respondent survey response deltas may indicate device condition, such as a razor condition, from analyzing end user experience. For example, if the quality of use of the device (e.g., shaving) decreases by 1 point 2 times in a row, the next use (e.g., shave) is the last use, (e.g., shave). Additionally, if the quality of shave decreases by 3 points suddenly, the razor is dead. In an embodiment, amount of work for life of razor may be calculated as work=force*distance.

In some embodiments, statistical correlation results may include second order features extracted from the described dataset. For example, extracted second order features may include average values across all sensors per use, such as per shave, deviation from panelist typical sensor data, cumulative time, such as cumulative shave time, and cumulative force.

The feedback prediction component 620 may predict one or more shaving features, based at least in part on the input data from a razor (e.g., one example of the device 105 in FIG. 1) using a machine learning model that has been trained using at least data from the set of sensors from a razor (e.g., one example of the device 105 in FIG. 1). For example, the input data may be from a razor that has been configured to provide sensor data from a subset of available sensors, configured to provide a subset of sensor data from available sensor data, and/or from only an IMU of the razor. The data used to train the machine learning model may, for example, include at least one additional sensor data than the input data (e.g., data from more sensors than the subset of available sensors, a larger subset of the sensor data, and/or from an IMU that provides more data than a trained IMU, etc.). An IMU of an off-the-shelf razor may also provide all raw sensor data to predict the shaving feature. In some embodiments, the server 600 can predict shaving features that includes a shaving stroke count, shaving quality information, razor end-of-life information, or any combination thereof.

The feedback prediction component 620 may also predict one or more features related to a grooming activity other than shaving, based at least in part on the input data from a device using a machine learning model that has been trained using at least data from the plurality of sensors. For example, the input data may be from a device that has been configured to provide sensor data from a subset of available sensors, configured to provide a subset of sensor data from available sensor data, and/or from only an IMU. The data used to train the machine learning model may, for example, include at least one additional sensor data than the input data. In some embodiments, the server 600 can predict features that includes a stroke count, quality information, end-of-life information, or any combination thereof.

The feedback component 625 may provide use feedback, such as shaving feedback, based on the one or more features of the device or use, such as shaving features. In some examples, the feedback, such as shaving feedback, includes an instruction for improving quality, such as shave quality. In some examples, the feedback, such as shaving feedback, includes replacement feedback of at least a limited life component of the device, such as razor (or razor cartridge) replacement feedback.

The feedback component 625 may provide feedback, such as shaving feedback, based on the trained machine learning model using data from, for example, the subset of the sensors of the device (e.g., razor). In an embodiment of the present disclosure, the feedback component 625 may include output data that indicate a probability of the end-of-life of the device, such as the device 105 end-of-life, such as the device 105 that is used by the user 100 in FIG. 1 to shave periodically.

The training component 630 may be an example of, or include aspects of, the corresponding element or elements described with reference to FIG. 8. In some examples, the machine learning model is trained using survey data collected from users, where the survey data includes shaving quality information, razor end-of-life information, or both. In an embodiment, the training component 630 may include a machine learning model such as the ANN 125 as illustrated in FIG. 1. The ANN 125 may predict device end-of-life information. In another embodiment, a learning model may be developed through creating the ANN 125, wherein input data are derived sensor data features (e.g. cumulative force, distance travelled, time under force) and output data are probability of razor end of life.

In some examples, the machine learning model is trained using survey data collected from users, where the survey data includes quality information for a grooming activity other than shaving, end-of-life information, or both. The ANN 125 may predict device end-of-life information. In another embodiment, a learning model may be developed through creating the ANN 125, wherein input data are derived sensor data features (e.g. cumulative force, distance travelled, time under force) and output data are probability of end of life.

In another embodiment, a learning model may be developed through creating the ANN 125 as illustrated in FIG. 1, wherein input data are derived sensor data features (e.g. cumulative force, distance travelled, time under force) and output data are probability of end-of-life (e.g., razor end-of-life).

In an embodiment, the ground truth data may be input to a machine learning (ML) algorithm to generate shave implement metadata. The ML algorithm may determine which part of the ground truth data provides a certain confidence interval (CI) to accurately determine metadata for an implement use parameter (e.g., shave feature). This may be an iterative process until a pre-determined CI is reached. Therefore, at each iteration, the ML algorithm may determine whether a CI has been met for the implement use parameter. If the result satisfies the CI, then the ML algorithm may proceed, and if the result does not satisfy the CI, the ML algorithm may repeat the input step. In one embodiment, data from a plurality of sensors may be used to accurately determine a stroke. The ground truth data may be input to a ML algorithm to determine a dataset (and therefore a set of sensors) that can accurately determine when a stroke occurs. In one example, the output data is compared to predicted data from the ML algorithm to verify whether the dataset (the set of sensors) can accurately determine stroke. If the dataset cannot accurately determine stroke, the ML algorithm may repeat until a CI of greater than n % is reached (e.g., greater than 90%). The ML algorithm may use more data. The output data of the ML algorithm that has met the CI is shave implement metadata. In some cases, a machine learning model may be trained using additional data for at least one additional sensor that is not included on the razor.

In an embodiment, the ground truth data may be input to an ML algorithm to generate implement metadata for a device other than a razor. The ML algorithm may determine which part of the ground truth data provides a CI to accurately determine metadata for an implement use parameter. This may be an iterative process until a pre-determined CI is reached. Therefore, at each iteration, the ML algorithm may determine whether a CI has been met for the implement use parameter. If the result satisfies the CI, then the ML algorithm may proceed, and if the result does not satisfy the CI, the ML algorithm may repeat the input step.

Figure 7:
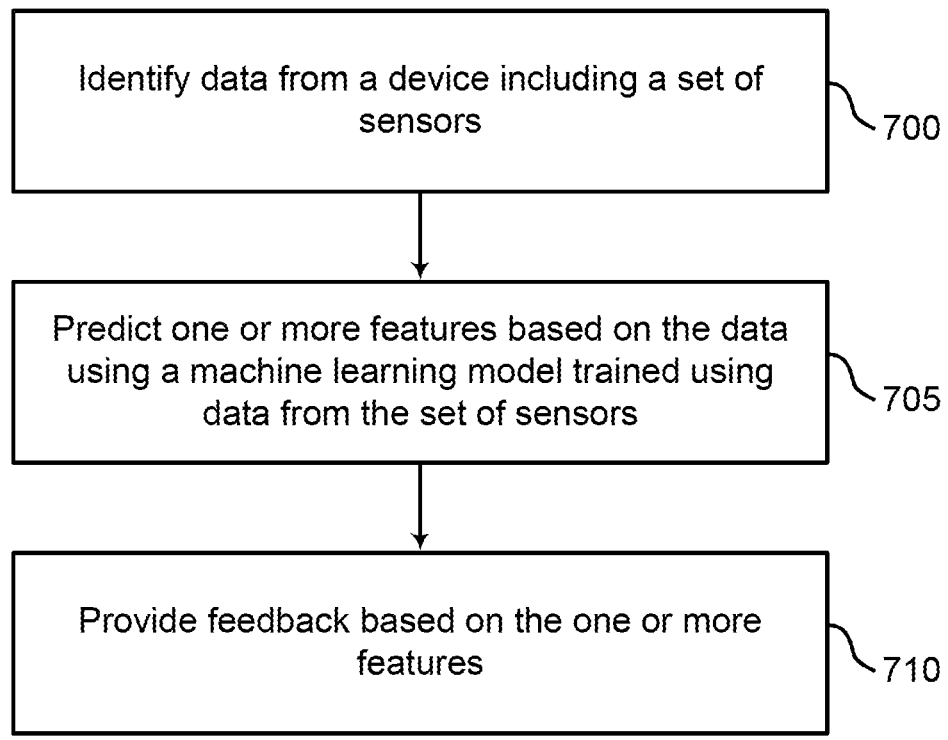
FIG. 7 shows an example of a process for feedback machine learning for a personal care device according to aspects of the present disclosure.

FIG. 7 shows an example of a process for feedback machine learning for a personal care device according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the server 600 may identify data from a device including a set of sensors on the device, such as the device 105 in FIG. 1 (e.g., a razor). In some cases, the operations of this step may refer to, or be performed by, a data collection component 615 or 815 as described with reference to FIGS. 6 and 8, respectively.

According to embodiments of the present disclosure, the data collection component 615 may include data preparation, cleanup and integrity check (e.g., garbage in/garbage out), feature engineering and extraction. A machine learning model, such as the ANN 125 in FIG. 1, may include creating a deep neural network model to predict force sensor output. Input data may include IMU sensor data and capacitive sensor data whereas output data may include force sensor data. Raw data recorded may include time in seconds (UTC-0), IMU data (e.g., acceleration (X, Y, Z), gyroscope (X, Y, Z)), force applied to head, capacitance of metal insert in head, case temperature, gravity axis (rough orientation of the device, such as a razor), and FSR calibration values. Raw data may include data from a six degree of freedom (6DoF) tracking device coupled to the personal care device that may contemporaneously capture data for the personal care device with data captured from one or more sensors on the personal care device (e.g., tracked data from a group of users, etc.).

In some embodiments, the set of sensors may include an IMU 320, a capacitance-to-digital converter, a force sensor 240, a rinse sensor 335, a grip sensor 340, a temperature sensor, an accelerometer, a gyroscope a magnetometer, a resistive contact, a piezo contact microphone, a Hall effect sensor, an external camera, a strain gauge, a load cell, a reed switch, a linear variable differential transformer, or any combination thereof.

In some embodiments, processed data may also include shave date, shave duration, stroke count (from force and IMU sensors), rinse count (head capacitance sensor), total rinse time, ambient temperature, minimal, maximal, and average force, number of strokes in each orientation (e.g., vertical up, vertical down, and horizontal), and force histogram for strokes. Additional processed data may include strokes (e.g., start index, end index, max force, gravity axis), analysis graphs, and filtered data.

In some embodiments, processed data may also include information for grooming activities other than shaving such as a session date, duration, stroke count (from force and IMU sensors), rinse count (head capacitance sensor), total rinse time, ambient temperature, minimal, maximal, and average force, number of strokes in each orientation (e.g., vertical up, vertical down, and horizontal), and force histogram for strokes. Additional processed data may include strokes (e.g., start index, end index, max force, gravity axis), analysis graphs, and filtered data.

In an embodiment, force and capacitive sensor data may be passed through a signal processing filter such as a Butterworth filter in order to flatten the frequency response. The input data to a neural network (e.g., ANN 125) may be normalized around a mean of 0. This may enable the neural network to progress quickly. For example, filtered force sensor values may be scaled down ×100 to mitigate exploding gradients during training.

At operation 705, a server, such as the server 600 in FIG. 6, may predict one or more features (e.g., shaving features) based on the data using a machine learning model trained using data from the set of sensors. In some cases, the operations of this step may refer to, or be performed by, a feedback prediction component as described with reference to FIG. 6. In some embodiments, the one or more features may include a stroke count, quality information, end-of-life information, or any combination thereof.

At operation 710, a server, such as the server 600 in FIG. 1, may provide feedback based on the one or more features. In some cases, the operations of this step may refer to, or be performed by, a feedback component 625 as described with reference to FIG. 6.

In an embodiment, a server, such as the server 600 in FIG. 1, may provide feedback based on the one or more features. In some examples, the feedback may include an instruction for improving the quality of a grooming session. The feedback may also include replacement feedback. Feedback may be based on the trained machine learning model using data from the subset of the sensors. In an embodiment of the present disclosure, shaving feedback may include output data that indicate a probability of device 105 end-of-life.

In some cases, a server, such as the server 600 in FIG. 1, may provide feedback other than shaving. For example, a safety razor may have a power supply, a (uni-directional) near-field communication device (e.g., Blue Tooth) and an IMU (e.g., multi axis accelerometer or gyroscope). The raw data relating to razor movement (e.g., velocity, orientation, acceleration) may be sent to a hub. The hub may transfer these raw data to a processor in the described network. The processor has an algorithm (e.g., applying machine learning or deep learning) to process the data to determine the types of a motion. The motion may include a normal stroke (e.g., shaving stroke), an accidental drop, the user putting the device (e.g., razor) down in a storage position between uses, or the user positioning the device (e.g., razor) under a faucet or shower head for rinsing. In the last instance, the network may send a return signal to the hub to in turn actuate a smart faucet or shower head during the period the device (e.g., razor) is identified as being in a "rinse" attitude. Combined faucet or shower head on time or flow rate data may be sent to an application on a user's smart device (e.g., phone, tablet, etc.) to educate the user about water consumption and suggest ways to reduce this. Some embodiments may use additional features of an internet of things (IoT) communication network.

While independent blocks and/or a particular order has been shown for illustration purposes, it is understood that one or more of the blocks of the method of FIG. 7 or components of the apparatus of FIG. 6 may be combined, omitted, bypassed, re-arranged, and/or flow in any order or be located on any device or a single device. For example, one or more components shown in FIG. 6 and/or one or more blocks shown in FIG. 7 may additionally or alternatively reside or be implemented on a personal care device, a hub, a server, an IoT device, or combinations thereof.

Figure 8:
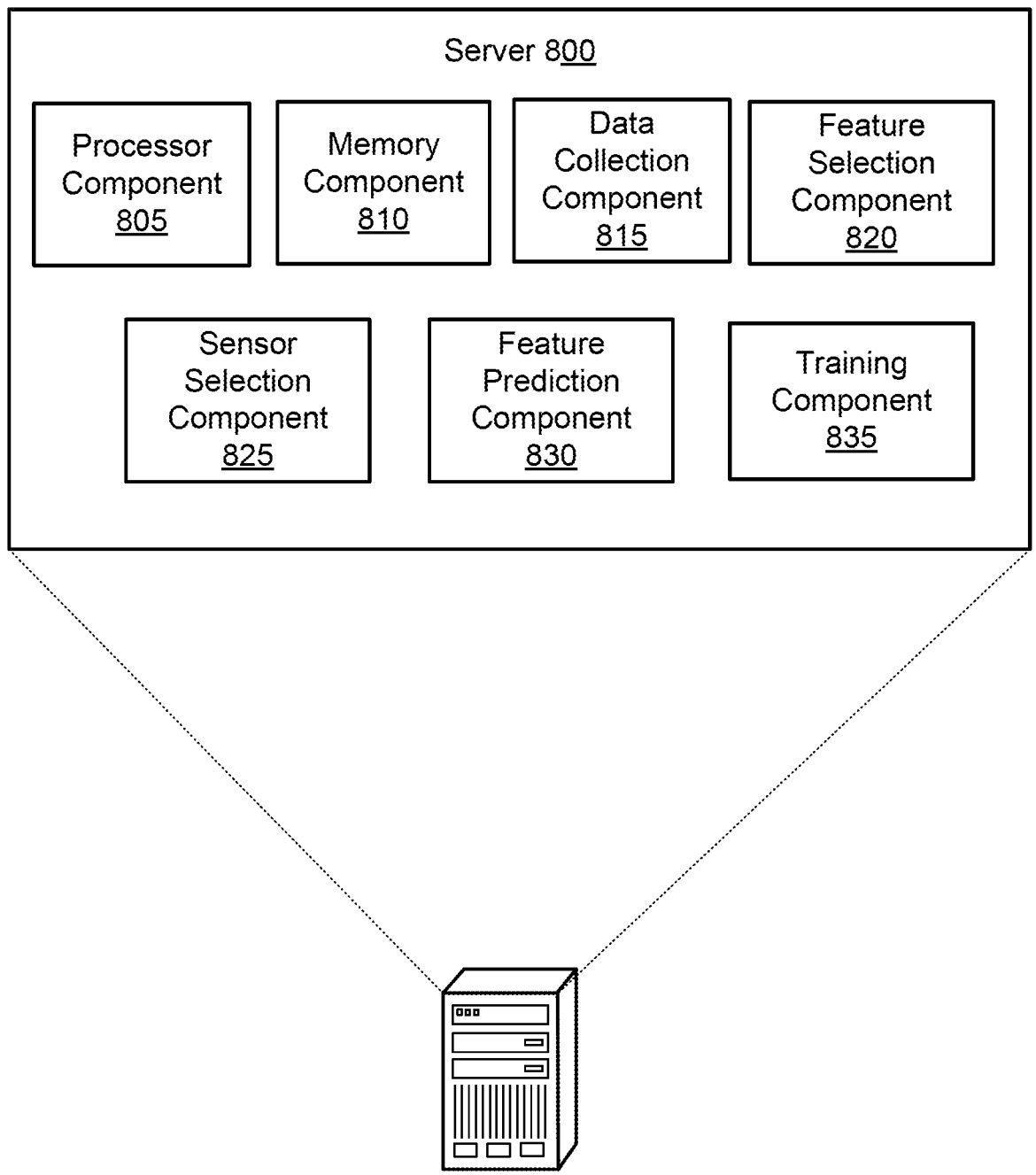
FIG. 8 shows an example of a sensor reduction server for a personal care system according to aspects of the present disclosure.

FIG. 8 shows an example of a sensor reduction server 800 for a personal care system according to aspects of the present disclosure. The server 800 may be an example of, or include aspects of, the corresponding element or elements described with reference to FIGS. 1 and 6.

The server 800 may include processor component 805, memory component 810, data collection component 815, feature selection component 820, sensor selection component 825, feature prediction component 830, and training component 835.

The server 800 may include an interactive device (e.g., razor) deep learning model that predicts characteristics (e.g., shave characteristics) while limiting the number of sensors on a device (e.g., the device 105 in FIG. 1). According to embodiments of the present disclosure, the server 800 may eliminate some sensors and still predict a device or component thereof (e.g., a cartridge's) end of life. For example, a razor (e.g., one example of the device 105 in FIG. 1) may have a plurality of sensors and some of the sensors may be removed.

In one embodiment, a force sensor, such as the force sensor 240 in FIG. 2, may be removed and still predict stroke count, classify stroke direction (e.g., horizontal, vertical up, vertical down, etc.). In an embodiment, a capacitive sensor, such as the capacitive sensor 325 in FIG. 3, may be removed and still classify rinses. In another embodiment, duration or length of use, such as duration of shave or shave length may be determined from IMU sensor data. For example, a user or a learning model may use acceleration and time data to calculate length, such as shave length. In some embodiments, length, such as shave length may be used as a predictor of end-of-life.

The processor component 805 may be an example of, or include aspects of, the corresponding element or elements described with reference to FIG. 6. The processor component 805 may be an example of, or include aspects of, the corresponding element or elements described with reference to FIG. 8. A processor may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip The memory component 810 may be an example of, or include aspects of, the corresponding element or elements described with reference to FIG. 6. The memory component 810 may be an example of, or include aspects of, the corresponding element or elements described with reference to FIG. 8. A computer memory may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

The data collection component 815 may be an example of, or include aspects of, the corresponding element or elements described with reference to FIG. 6.

Some embodiments of the present disclosure may enable one or more sensors configured based on implement configuration data to generate raw use data. This process may depend on a configuration of an implement. For example, if the configuration includes manufacturing the implement, such as a shave implement, with only a minimal number of sensors needed to accurately determine shave implement metadata for an implement use parameter, then a user, such as the user 100 in FIG. 1, would power on a device to provide power to the physically installed special purpose sensors (which may be a minimal number). If the configuration includes selectively enabling or disabling a total number of sensors on the shave implement to a minimal number of sensors needed to accurately determine the shave implement metadata, then a user, such as the user 100 in FIG. 1, would selectively power on or power off to a minimal number of sensors. If the configuration includes selectively programming one or more sensors to capture only a subset of the data that it can capture (e.g., only a subset of accelerometer data, only a subset of gyro data, such as a subset of the axis data, etc.), then a user, such as the user 100 in FIG. 1, would selectively program one or more sensors to capture only a subset of the data that it can capture (i.e., capture data (may be subset) that it can conventionally capture). In the foregoing examples, however, a device may be configured to additionally or alternatively automatically enable, disable, and/or program itself based on a set of instructions executed by its processor and/or stored in its memory.

The implement metadata generated from a ML algorithm may be determined and used in the back end rather than the front end of the process. For example, an off-the-shelf razor with an IMU, such as the IMU 320 in FIG. 3, or a sensor suite sufficient to collect information necessary for the determination may be used to collect as much raw data as possible. The raw data may be sent to a hub and then to a communications network, such as the communication network 110 in FIG. 1. In the communications network, the output (e.g., a signature of a subset of the data that can accurately determine when a stroke occurs) may be used to evaluate the raw sensor data to determine whether or how the shave implement is used (e.g., stroke) to make a recommendation (e.g., for replenishment, change of product, etc.) and/or automatically send goods.

The feature selection component 820 may identify one or more features, such as shaving features, based on the data. In some examples, the one or more features, such as shaving features, include a stroke count, a stroke orientation, or both.

The sensor selection component 825 may identify a subset of the sensors, where at least one of the sensors is not included in the subset of the sensors. In some examples, the at least one of the sensors includes a force sensor.

Embodiments of the present disclosure may include shave implement metadata to configure a shave implement. The configuration can happen in software, hardware, or a combination of both. In some cases, configuring an implement, such as a shave implement, may involve physically installing one or more special purpose sensors. For example, using microcode to reconfigure sensors, using configurable hardware such as a field programmable gate array (FPGA), using voltage rails to selectively power on or power off components, etc. In some examples, the configuration of an implement, such as a shave implement, may include manufacturing the shave implement with only a minimal number of sensors needed to accurately determine shave implement metadata for an implement use parameter. The configuration may include selectively enabling or disabling a total number of sensors on the implement, such as a shave implement, to a minimal number of sensors needed to accurately determine the implement metadata, such as the shave implement metadata. The configuration may also include selectively programming one or more sensors to capture only a subset of the data that it can capture (e.g., only a subset of accelerometer data, only a subset of gyro data, such as a subset of the axis data, etc.). Benefits of the configurations above may include simplifying the hardware stack, utilizing less power, utilizing less processing, etc. In one embodiment of the present disclosure, an IMU may be physically installed on the shave implement. The IMU may be trained by machine learning models (e.g., deep neural networks) to provide information that can be used to accurately determine stroke.

The feature prediction component 830 may train a machine learning model to predict the one or more features, such as shaving features, using data from a subset of sensors from a device, such as from a razor (e.g., one example of the device 105 in FIG. 1). In some examples, the machine learning model may predict the one or more features, such as shaving features including a stroke count, a stroke orientation, or both.

The training component 835 may be an example of, or include aspects of, the corresponding element or elements described with reference to FIG. 6. In some embodiments, a machine learning model is trained using additional data for at least one additional sensor that is not included on the razor. In some examples, the at least one additional sensor includes a force sensor. In further examples, the at last one additional sensor is located on a six degree of freedom (6DoF) tracking device coupled to the personal care device that may contemporaneously capture data for the personal care device with data captured from one or more sensors on the personal care device (e.g., tracked data from a group of users, etc.).

In an embodiment, ground truth data may be input to a ML algorithm to determine a subset of the data (and therefore a subset of sensors) that can accurately determine when a stroke occurs. In one example, the output data is compared to predicted data from the ML algorithm to verify whether a subset of the data (a subset of sensors) can accurately determine stroke. If the subset of the data cannot accurately determine stroke, the ML algorithm may repeat until a CI of greater than n % is reached (e.g., greater than 90%). The ML algorithm may use more data. The output data of the ML algorithm that has met the CI is shave implement metadata.

Experiments are conducted on a sensor reduction server 800. In some examples, participants shave using a razor, such as the device 105 in FIG. 1, while an observer records shave characteristics. Data generated may include sensor data from a razor, such as the device 105 in FIG. 1 (e.g., 100 Hz), and ground truth data of shave characteristics (e.g., stroke count, stroke direction, rinse count). A 100 Hz ground truth dataset may have shave dataset count equal to 98. The shave dataset may include 97 unique participants or other statistically significant population. In another example, a 100 Hz ground truth dataset may have shave dataset count equal to 30. The shave dataset may include 15 unique participants. Notably, results from a force prediction neural network significantly improve as the sensor data collection frequency increases and provides accurate feature prediction when, for example, an RNN (e.g., LSTM-RNN) is trained with 100 Hz sensor data. In one example, predicted force curves follow the patterns of true force curves with substantial peak alignment.

One embodiment describes methods of storing the raw use data on the server. In this case, the raw use data may depend on a configuration of an implement, or one or more sensors configured based on implement configuration data. For example, if the configuration may include manufacturing a shave implement with only a minimal number of sensors needed to accurately determine shave implement metadata for an implement use parameter, then the data may be all raw data from an IMU that has been provided to collect certain data (e.g., only all accelerometer data, only all gyro data, etc.). For example, a user may power on a device to supply power to the physically installed special purpose sensors (which may be a minimal number).

According to some embodiments, if the configuration includes selectively enabling or disabling a total number of sensors on the shave implement to a minimal number of sensors needed to accurately determine the shave implement metadata, then a user would selectively power on or power off sensors collecting data. If the configuration includes selectively programming one or more sensors to capture only a subset of the data that it can capture (e.g., only a subset of accelerometer data, only a subset of gyro data, such as a subset of the axis data, etc.), then data may be collected from selectively programmed sensors. Alternatively, an off-the-shelf razor may provide all raw data in its capabilities.

Figure 9:
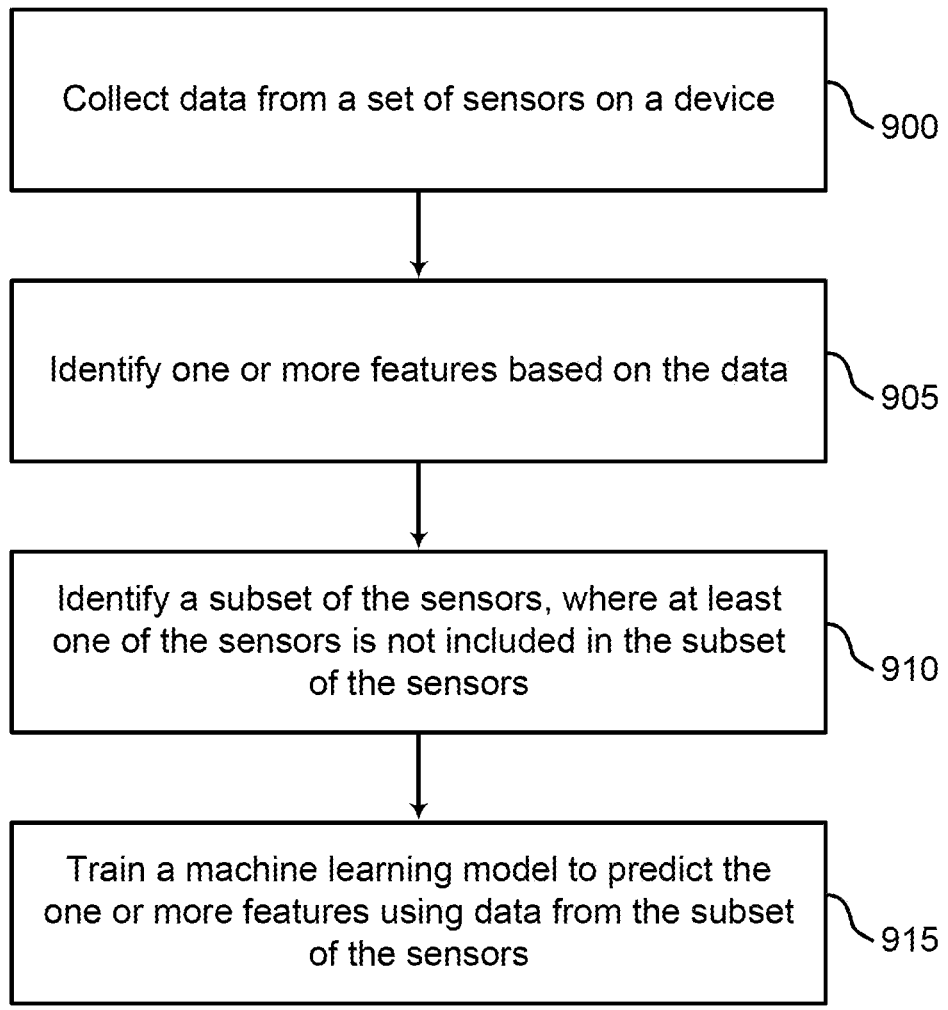
FIG. 9 shows an example of a process for sensor reduction machine learning for a personal care device according to aspects of the present disclosure.

FIG. 9 shows an example of a process for sensor reduction machine learning for a personal care device according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 900, the system collects data from a set of sensors on a device, such as a razor (e.g., one example of the device in FIG. 1). In some cases, the operations of this step may refer to, or be performed by, a data collection component as described with reference to FIGS. 6 and 8.

At operation 905, the system identifies one or more features, such as shaving features, based on the data. In some cases, the operations of this step may refer to, or be performed by, a feature selection component as described with reference to FIG. 8.

At operation 910, the system identifies a subset of the sensors, where at least one of the sensors is not included in the subset of the sensors. In some cases, the operations of this step may refer to, or be performed by, a sensor selection component as described with reference to FIG. 8.

In some examples, the configuration of a shave implement may include manufacturing the shave implement with only a minimal number of sensors needed to accurately determine shave implement metadata for an implement use parameter. The configuration may include selectively enabling or disabling a total number of sensors on the shave implement to a minimal number of sensors needed to accurately determine the shave implement metadata. The configuration may also include selectively programming one or more sensors to capture only a subset of the data that it can capture (e.g., only a subset of accelerometer data, only a subset of gyro data, such as a subset of the axis data, etc.). In one embodiment of the present disclosure, IMU may be physically installed on the shave implement. The IMU may be trained by machine learning models (e.g., deep neural networks) to provide information that can be used to accurately determine stroke.

In some examples, the configuration of a personal care device other than a razor may include manufacturing the device with a minimal number of sensors needed to accurately determine implement metadata for an implement use parameter. The configuration may include selectively enabling or disabling a total number of sensors on the implement to a minimal number of sensors needed to accurately determine the related implement metadata. The configuration may also include selectively programming one or more sensors to capture only a subset of the data that it can capture (e.g., only a subset of accelerometer data, only a subset of gyro data, such as a subset of the axis data, etc.).

In an embodiment, ground truth data may be input to a ML algorithm to determine a subset of the data (and therefore a subset of sensors) that can accurately determine when a stroke occurs. In one example, the output data is compared to predicted data from the ML algorithm to verify whether a subset of the data (a subset of sensors) can accurately determine stroke. If the subset of the data cannot accurately determine stroke, the ML algorithm may repeat until a CI of greater than n % is reached (e.g., greater than 90%). The ML algorithm may use more data. The output data of the ML algorithm that has met the CI is implement data, such as shave implement metadata.

At operation 915, the system trains a machine learning model to predict the one or more features using data from the subset of the sensors. In some cases, the operations of this step may refer to, or be performed by, a feature prediction component as described with reference to FIG. 8.

One embodiment of the present disclosure describes inputting the raw use data to an algorithm to generate implement use data. There may be a step of comparing the raw use data to reference data (e.g., the shave implement metadata). For example, the raw data may be collected from an off-the-shelf razor (having a sufficient number of sensors for a particular use parameter) or a configured shave implement. The raw use data may be input to a comparator with the metadata output (a signature of a subset of ground truth data can accurately determine when a stroke occurs) to determine whether or how the shave implement is used (e.g., stroke). The implement use data may be forwarded to a counter to keep track of the use (e.g., stroke counter, etc.).

Embodiments of the present disclosure include pulling existing data from a bank, live data from a user, live data from a group of users, tracked data over time from a user, tracked data from a group of users, or a composition of any combination of these. The data may be combined (i.e., data inputted by users and data gathered from the users) to foster end of life prediction.

One embodiment of the present disclosure describes methods of using the data. The same or different cloud servers as those described herein may send the data to another network or send the data to a memory (e.g., storage, cache, etc.). In one example, a process of using the data may involve accessing user information or general reference information to determine whether it is appropriate to automatically ship replacement goods to the user, provide recommendations, etc. In one embodiment, an SQL server may be used to process the information from the user. This may include receiving user preferences, payment information, calendar evaluations, confirmation, etc., from the user profile from an enterprise server or from directly from the user via a personal computing device (e.g., via an application), etc., or from a combination thereof.

In one embodiment, the raw use data may be input to the described system or network to accurately determine a % end-of-life for a device or component thereof, such as a razor cartridge. For example, the implement use data (e.g., which indicates a number of strokes) is utilized with user data (e.g., ordering patterns, travel patterns, cartridge preferences, actual strokes/cartridge, preference using strokes/cartridge, etc.) that is collected from a user profile, real time statistics, or from user input via an application. Additionally or alternatively, the implement use data may be compared to general reference data (e.g., general strokes per implement (e.g., cartridge), general strokes per implement (e.g., cartridge) for a particular age group, for a particular geographic area, etc.). Strokes, for example, may be used to determine usable life for a percent of life calculation (e.g., 90% of life left) which then is used for recommendations (other products, other types of cartridges, companion products, etc.) or replenishment.

While independent blocks and/or a particular order has been shown for illustration purposes, it is understood that one or more of the blocks of any of the method of FIG. 9 or components of the apparatus of FIG. 8 may be combined, omitted, bypassed, re-arranged, and/or flow in any order or be located on any device or a single device. For example, one or more components shown in FIG. 8 and/or one or more blocks shown in FIG. 9 may additionally or alternatively reside or be implemented on a personal care device, a hub, a server, an IoT device, or combinations thereof.

ADDITIONAL NOTES AND EXAMPLES

Additional examples include a system, an apparatus, non-transitory computer readable medium, and a method to train a machine learning model, execute a trained machine learning model, capture and/or process data for the machine learning model, provide feedback based on the output of the trained machine learning model, or combinations thereof.

Example 1 may include a system comprising a personal care device including, a plurality of sensors, and a processor coupled to the plurality of sensors, wherein the processor is configured to execute a machine learning model that has been trained to predict a use feature related to the personal care device based on data from the plurality of sensors.

Example 2 may include the system of Example 1, wherein the plurality of sensors include an accelerometer and a gyroscope located on an inertial measurement unit (IMU) of the personal care device.

Example 3 may include the system of any of Examples 1 to 2, wherein the IMU includes, at least one accelerometer per axis for three axes, and at least one gyroscope per axis for the three axes.

Example 4 may include the system of any of Examples 1 to 3, wherein each of the at least one accelerometer and the at least one gyroscope includes a respective micro-electro-mechanical-system (MEMS).

Example 5 may include the system of any of Examples 1 to 4, wherein the IMU lacks a magnetometer.

Example 6 may include the system of any of Examples 1 to 5, further including a filter to prevent data from a magnetometer from reaching one or more of a machine learning model to be trained or the machine learning model that has been trained.

Example 7 may include the system of any of Examples 1 to 6, wherein the processor is located on the IMU and is physically coupled to the accelerometer and the gyroscope via a connection on the IMU.

Example 8 may include the system of any of Examples 1 to 7, wherein the processor is located on a controller of the personal care device and is physically coupled to the plurality of sensors via a connection between the controller and the IMU.

Example 9 may include the system of any of Examples 1 to 8, wherein the processor is located on a hub proximate to the personal care device and is communicatively coupled to the plurality of sensors via a connection between the hub and the personal care device.

Example 10 may include the system of any of Examples 1 to 9, wherein the processor is located on a server communicatively coupled to one or more of the personal care device or a hub proximate to the personal care device, and wherein the processor is communicatively coupled to the plurality of sensors via a connection between the server and one or more of the personal care device or the hub.

Example 11 may include the system of any of Examples 1 to 10, wherein the personal care device is to provide the data from the plurality of sensors to the hub via a short-range wireless connection and the hub is to provide the data to the server located in a cloud computing network via a long-range connection.

Example 12 may include the system of any of Examples 1 to 11, wherein the machine learning model is a stacked long short-term memory recurrent neural network (LSTM-RNN) that has been trained.

Example 13 may include the system of any of Examples 1 to 12, wherein the use feature comprises force applied by the personal care device, distance travelled by the personal care device, work performed by the personal care device, or combinations thereof.

Example 14 may include the system of any of Examples 1 to 13, wherein the processor is configured to execute one or more of, a first machine learning model to predict a first use feature related to the personal care device based only on accelerometer data and gyroscope data input to a machine learning model to be trained, wherein the first use feature includes the force, a second machine learning model to predict a second use feature related to the personal care device based only on the accelerometer data the gyroscope data input to the machine learning model to be trained, wherein the second use feature includes the distance travelled, or a third machine learning model to predict a third use feature related to the personal care device based only on the accelerometer data and the gyroscope data input to the machine learning model to be trained, wherein the third use feature includes the work performed by the personal care device.

Example 15 may include the system of any of Examples 1 to 14, wherein the processor is configured to predict one or more of a stroke count, a stroke force, a stroke distance, a rinse event, or an end-of-life related to the personal care device based on the use feature.

Example 16 may include the system of any of Examples 1 to 15, wherein the processor is configured to one or more of, utilize a function to predict one or more of the stroke count, the stroke force, the stroke distance, the rinse event, or the end-of-life based on the use feature, or execute an additional machine learning model trained to determine one or more of the stroke count, the stroke force, the stroke distance, the rinse event, or the end-of-life based on the use feature.

Example 17 may include the system of any of Examples 1 to 16, wherein the personal care device comprises a razor device.

Example 18 may include the system of any of Examples 1 to 17, wherein the razor device is proximate to and communicatively coupled with an Internet-of-Things (IoT) device.

Example 19 may include the system of any of Examples 1 to 18, further including a radio frequency interface, memory, storage, a sensor controller, an input/output device, or combinations thereof.

Example 20 may include the system of any of Examples 1 to 19, wherein the processor is configured to one or more of, train the machine learning model to predict the use feature related to the personal care device based on the data from the plurality of sensors, collect data from the plurality of sensors, or provide feedback based on the use feature.

Example 21 may include at least one computer readable storage medium comprising a set of instructions, which when executed by a processor, cause the processor to implement the system of any of Examples 1 to 20. For example, the at least one computer readable storage medium comprises the set of instructions, which when executed, cause the processor to execute a machine learning model that has been trained to predict a use feature related to a personal care device based on data from a plurality of sensors.

Example 22 may include a method to implement operations of the system of any of Examples 1 to 20. For example, the method may include capturing data via a plurality of sensors of a personal care device, and executing a machine learning model that has been trained to predict a use feature related to the personal care device based on the data.

Example 23 may include a method comprising means to implement operations of the system of any of Examples 1 to 20. For example, the method may include means for capturing data via a plurality of sensors of a personal care device, and means for executing a machine learning model that has been trained to predict a use feature related to the personal care device based on the data.

Example 24 may include a feature prediction device comprising a feature prediction component configured to train a machine learning model to predict a use feature related to a personal care device using data from a subset of a set of sensors, wherein the feature prediction component is configured to, initialize the machine learning model with a set of initial model parameters, input the data from the subset of the set of sensors into the machine learning model, execute the machine learning model to generate output data corresponding to the use feature, compare the output data to reference data to determine whether the machine learning model predicts the use feature, and iteratively update at least one model parameter, iteratively input the data from the subset of the set of sensors, and iteratively compare the output data to the reference data until the machine learning model predicts the use feature related to the personal care device.

Example 25 may include the feature prediction device of Example 24, wherein the initial model parameters include a model width, a model length, model link connections between model nodes, a weight to be applied to the input data, a bias to be applied to the input data, or combinations thereof.

Example 26 may include the feature prediction device of any of Examples 24 to 25, wherein the subset of the set of sensors includes an accelerometer and a gyroscope located on the personal care device, and wherein the feature prediction component is configured to, initialize the machine learning model with the set of initial model parameters, input the data from the accelerometer and the gyroscope into the machine learning model, execute the machine learning model to generate the output data corresponding to the use feature, compare the output data to the reference data to determine whether the machine learning model predicts the use feature, and iteratively update the at least one model parameter, iteratively input the data from the from the accelerometer and the gyroscope, and iteratively compare the output data to the reference data until the machine learning model predicts the use feature related to the personal care device.

Example 27 may include the feature prediction device of any of Examples 24 to 26, wherein the accelerometer and the gyroscope are located on an inertial measurement unit (IMU) of the personal care device.

Example 28 may include the feature prediction device of any of Examples 24 to 27, wherein the feature prediction device is located on a server communicatively coupled to one or more of the personal care device or a hub proximate to the personal care device, and wherein the feature prediction component is communicatively coupled to the subset of the set of sensors via a connection between the server and one or more of the personal care device or the hub.

Example 29 may include the feature prediction device of any of Examples 24 to 28, wherein the personal care device is to provide the data from the plurality of sensors to the hub via a short-range wireless connection and the hub is to provide the data to the server located in a cloud computing network via a long-range connection.

Example 30 may include the feature prediction device of any of Examples 24 to 29, wherein the feature prediction component is located on one or more of the personal care device or a hub proximate to the personal care device.

Example 31 may include the feature prediction device of any of Examples 24 to 30, wherein the machine learning model is a stacked long short-term memory recurrent neural network (LSTM-RNN).

Example 32 may include the feature prediction device of any of Examples 24 to 31, wherein the use feature comprise force applied by the personal care device, distance travelled by the personal care device, work performed by the personal care device, or combinations thereof.

Example 33 may include the feature prediction device of any of Examples 24 to 32, wherein the feature prediction component is configured to one or more of, initialize and execute a first machine learning model to predict a first use feature related to the personal care device based only on accelerometer data and gyroscope data input to a machine learning model to be trained, wherein the first use feature includes the force and the reference data includes data from a force sensor on the personal care device, data from a capacitance sensor on the personal care device, or combinations thereof, initialize and execute a second machine learning model to predict a second use feature related to the personal care device based only on the accelerometer data and the gyroscope data input to the machine learning model to be trained, wherein the second use feature includes the distance travelled and the reference data includes data from a six degree of freedom (6DoF) tracking device coupled to the personal care device, or initialize and execute a third machine learning model to predict a third use feature related to the personal care device based only on the accelerometer data and the gyroscope data input to the machine learning model to be trained, wherein the third use feature includes the work performed by the personal care device and the reference data incudes data from the force sensor on the personal care device, data from the capacitance sensor on the personal care device, data from the 6DoF tracking device, or combinations thereof.

Example 34 may include the feature prediction device of any of Examples 24 to 33, wherein the feature prediction component is configured to predict one or more of a stroke count, a stroke force, a stroke distance, a rinse event, or an end-of-life related to the personal care device based on the use feature.

Example 35 may include the feature prediction device of any of Examples 24 to 34, wherein the feature prediction component is configured to one or more of, utilize a function to predict one or more of the stroke count, the stroke force, the stroke distance, the rinse event, or the end-of-life based on the use feature, or execute an additional machine learning model trained to determine one or more of the stroke count, the stroke force, the stroke distance, the rinse event, or the end-of-life based on the use feature.

Example 36 may include the feature prediction device of any of Examples 24 to 35, wherein the personal care device comprises a razor device.

Example 37 may include the feature prediction device of any of Examples 24 to 36, further including one or more of, a data collection device including a data collection component configured to one or more of, collect data from the set of sensors, wherein the set of sensors includes an accelerometer of the personal care device, a gyroscope of the personal care device, and an additional sensor located on the personal care device, an additional sensor located on a tracking device coupled to the personal care device, or combinations thereof, prepare the data before it reaches the machine learning model, or collect user profile data that is to be used to train the machine learning model, or a feedback device including a feedback component configured to provide feedback based on the use feature related to the personal care device.

Example 38 may include at least one computer readable storage medium comprising a set of instructions, which when executed by a processor, cause the processor to implement the feature prediction device of any of Examples 24 to 37. For example, the at least one computer readable storage medium comprises the set of instructions, which when executed, cause the processor to implement a feature prediction component to train a machine learning model to predict a use feature related to a personal care device using data from a subset of a set of sensors.

Example 39 may include a method to implement operations of the feature prediction device of any of Examples 24 to 37. For example, the method may include training a machine learning model to predict a use feature related to a personal care device using data from a subset of a set of sensors.

Example 40 may include a method comprising means to implement operations of the feature prediction device of any of Examples 24 to 37. For example, the method may include means for training a machine learning model to predict a use feature related to a personal care device using data from a subset of a set of sensors.

Example 41 may include a data collection device comprising a data collection component configured to collect data from a set of sensors, wherein the set of sensors includes an accelerometer on a personal care device, a gyroscope on a personal care device, and an additional sensor located on the personal care device, an additional sensor located on a tracking device coupled to the personal care device, or combinations thereof.

Example 42 may include the data collection device of Example 41, wherein the data collection component is to provide access to the data, and wherein the data is to be provided to one or more of, a comparator configured to, receive output data from a machine learning model to be trained, wherein the machine learning model to be trained is to receive data from a subset of the set of sensors, receive reference data from the set of sensors, and compare the output data with the reference data, or a machine learning model trained to predict a use feature related to the personal care device based on the data from the subset set of sensors.

Example 43 may include the data collection device of any of Examples 41 to 42, wherein the set of sensors includes an IMU, a capacitance-to-digital converter, a force sensor, a rinse sensor, a grip sensor, a temperature sensor, an accelerometer, a gyroscope a magnetometer, a resistive contact, a piezo contact microphone, a Hall effect sensor, an external camera, a strain gauge, a load cell, a reed switch, a linear variable differential transformer, or combinations thereof.

Example 44 may include the data collection device of any of Examples 41 to 43, wherein the data collection component is configured to prepare the data before it reaches the machine learning model.

Example 45 may include the data collection device of any of Examples 41 to 44, wherein the data collection component is configured to implement flattening, normalization, rescaling, clock synchronization, remove-and-split, or combinations thereof.

Example 46 may include the data collection device of any of Examples 41 to 45, wherein the flattening includes passing the input data through a Butterworth filter to flatten frequency response, wherein the normalization includes normalizing the input data around a mean value, and wherein the rescaling includes scaling the input data down to minimize exploding gradients during training.

Example 47 may include the data collection device of any of Examples 41 to 46, wherein the clock synchronization includes using corresponding signals in the input data and in the reference data to eliminate an offset between the input data and the reference data.

Example 48 may include the data collection device of any of Examples 41 to 47, wherein the remove-and-split includes, removing periods of inactivity longer than a predetermined period in the reference data, and splitting remaining periods of activity into subset periods of activity.

Example 49 may include the data collection device of any of Examples 41 to 48, wherein the data collection component is configured to collect user profile data that is to be used to train a machine learning model.

Example 50 may include the data collection device of any of Examples 41 to 49, wherein the user profile data includes questionnaire data.

Example 51 may include the data collection device of any of Examples 41 to 50, wherein the data collection component is located on one or more of the personal care device, a hub proximate and coupled to the personal care device, or a server coupled to one or more of the personal care device or the hub.

Example 52 may include at least one computer readable storage medium comprising a set of instructions, which when executed by a processor, cause the processor to implement the data collection device of any of Examples 41 to 51. For example, the at least one computer readable storage medium comprises the set of instructions, which when executed, cause the processor to implement a data collection component to collect data from a set of sensors, wherein the set of sensors includes an accelerometer on a personal care device, a gyroscope on the personal care device, and an additional sensor located on the personal care device, an additional sensor located on a tracking device coupled to the personal care device, or combinations thereof.

Example 53 may include a method to implement operations of the data collection device of any of Examples 41 to 51. For example, the method may include collecting data from a set of sensors, wherein the set of sensors includes an accelerometer on a personal care device, a gyroscope on the personal care device, and an additional sensor located on the personal care device, an additional sensor located on a tracking device coupled to the personal care device, or combinations thereof.

Example 54 may include a method comprising means to implement operations of the data collection device of any of Examples 41 to 51. For example, the method may include means for collecting data from a set of sensors, wherein the set of sensors includes an accelerometer on a personal care device, a gyroscope on the personal care device, and an additional sensor located on the personal care device, an additional sensor located on a tracking device coupled to the personal care device, or combinations thereof.

Example 55 may include a feedback device comprising a feedback component configured to provide feedback based on a use feature related to a personal care device, wherein the use feature is predicted using a machine learning model trained using data from a subset of a set of sensors.

Example 56 may include the feedback device of Example 55, wherein the feedback comprises a control function on the personal care device, a control function on an Internet-of-Things (IoT) device proximate to the personal care device, a use recommendation, a replenishment function, replacement information, or combinations thereof.

Example 57 may include the feedback device of any of Examples 55 to 56, wherein the feedback component is configured to initiate a control instruction to control an element of the personal care device.

Example 58 may include the feedback device of any of Examples 55 to 57, wherein the personal care device includes a razor device, wherein the element includes one or more of a cartridge of the razor device or a dispenser of the razor device, and wherein the feedback component is configured to, cause the control instruction to reach a controller module coupled to the cartridge of the razor device to modify how one or more components of the cartridge touch the user, or cause the control instruction to reach a controller module coupled to the dispenser of the razor device to modify how a personal care composition is dispensed from the razor device.

Example 59 may include the feedback device of any of Examples 55 to 58, wherein the feedback component is located on one or more of the personal care device, a hub proximate and coupled to the personal care device, or a server coupled to one or more of the personal care device or the hub.

Example 60 may include at least one computer readable storage medium comprising a set of instructions, which when executed by a processor, cause the processor to implement the data collection device of any of Examples 55 to 59. For example, the at least one computer readable storage medium comprises the set of instructions, which when executed, cause the processor to implement a feedback component to provide feedback based on a use feature related to a personal care device, wherein the use feature is predicted using a machine learning model trained using data from a subset of a set of sensors.

Example 61 may include a method to implement operations of the feedback device of any of Examples 55 to 59. For example, the method may include providing feedback based on a use feature related to a personal care device, wherein the use feature is predicted using a machine learning model trained using data from a subset of a set of sensors.

Example 62 may include a method comprising means to implement operations of the feedback device of any of Examples 55 to 59. For example, the method may include means for providing feedback based on a use feature related to a personal care device, wherein the use feature is predicted using a machine learning model trained using data from a subset of a set of sensors.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods and/or components may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Similarly, the list of one or more of X, Y, or Z or a list of X, Y, Z, or combinations thereof means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A system comprising:
a personal care device including a plurality of sensors, wherein the plurality of sensors include an accelerometer and a gyroscope located on an inertial measurement unit (IMU) of the personal care device; and
a processor coupled to the plurality of sensors, wherein the processor is configured to execute a machine learning model comprising an artificial neural network that has been trained to predict a use feature related to the personal care device based on data from the plurality of sensors, wherein the use feature comprises force applied by the personal care device, distance travelled by the personal care device, or combinations thereof, wherein, when the machine learning model comprising the artificial neural network is executed by the processor, force applied by the personal care device is predicted based only on accelerometer data and gyroscope data from the IMU input to a machine learning model that has been trained to predict and output a measurement value of the force, distance travelled by the personal care device is predicted based only on accelerometer data and gyroscope data from the IMU input to a machine learning model that has been trained to predict and output a measurement value of the distance travelled, or combinations thereof.

2. The system of claim 1, wherein the IMU lacks a magnetometer.

3. The system of claim 1, further including a filter to prevent data from a magnetometer from reaching one or more of a machine learning model to be trained or the machine learning model that has been trained to predict the use feature.

4. The system of claim 1, wherein the processor is located on the IMU and is physically coupled to the accelerometer and the gyroscope via a connection on the IMU.

5. The system of claim 1, wherein the processor is located on a controller of the personal care device and is physically coupled to the plurality of sensors via a connection between the controller and the IMU.

6. The system of claim 1, wherein the processor is located on a hub proximate to the personal care device and is communicatively coupled to the plurality of sensors via a connection between the hub and the personal care device.

7. The system of claim 1, wherein the processor is located on a server communicatively coupled to one or more of the personal care device or a hub proximate to the personal care device, and wherein the processor is communicatively coupled to the plurality of sensors via a connection between the server and one or more of the personal care device or the hub.

8. The system of claim 7, wherein the personal care device is to provide the data from the plurality of sensors to the hub via a short-range wireless connection and the hub is to provide the data to the server located in a cloud computing network via a long-range connection.

9. The system of claim 1, wherein the machine learning model comprising the artificial neural network is a stacked long short-term memory recurrent neural network (LSTM-RNN) that has been trained.

10. The system of claim 1, wherein the processor is configured to calculate work performed by the personal care device based on independently predicted force and distance travelled.

11. The system of claim 1, wherein the processor is configured to execute one or more of:
a first machine learning model to predict and output the measurement value of the force based only on the accelerometer data and the gyroscope data from the IMU input to the first machine learning model;
a second machine learning model to predict and output the measurement value of the distance travelled based only on the accelerometer data and the gyroscope data from the IMU input to the second machine learning model; or
a third machine learning model to predict and output a measurement value of work performed by the personal care device based only on accelerometer data and gyroscope data from the IMU input to the third machine learning model.

12. The system of claim 1, wherein the processor is configured to predict one or more of a stroke count, a stroke force, a stroke distance, a rinse event, or an end-of-life related to the personal care device based on the use feature.

13. The system of claim 12, wherein the processor is configured to one or more of:
utilize a function to predict one or more of the stroke count, the stroke force, the stroke distance, the rinse event, or the end-of-life based on the use feature; or
execute an additional machine learning model trained to determine one or more of the stroke count, the stroke force, the stroke distance, the rinse event, or the end-of-life based on the use feature.

14. The system of claim 1, wherein the personal care device comprises a razor device.

15. The system of claim 14, wherein the razor device is proximate to and communicatively coupled with an Internet-of-Things (IoT) device.

16. The system of claim 1, further including a radio frequency interface, memory, storage, a sensor controller, an input/output device, or combinations thereof.

17. The system of claim 1, wherein the processor is configured to one or more of:
train the machine learning model to predict the use feature related to the personal care device based on the data from the plurality of sensors;
collect data from the plurality of sensors; or
provide feedback based on the use feature.

18. At least one computer readable storage medium comprising a set of instructions, which when executed by a processor, cause the processor to execute a machine learning model comprising an artificial neural network that has been trained to predict a use feature related to a personal care device based on data from a plurality of sensors including an accelerometer and a gyroscope located on an inertial measurement unit (IMU) of the personal care device, wherein the use feature comprises force applied by the personal care device, distance travelled by the personal care device, or combinations thereof, wherein, when the machine learning model comprising the artificial neural network is executed by the processor, force applied by the personal care device is predicted based only on accelerometer data and gyroscope data from the IMU input to a machine learning model that has been trained to predict and output a measurement value of the force, distance travelled by the personal care device is predicted based only on accelerometer data and gyroscope data from the IMU input to a machine learning model that has been trained to predict and output a measurement value of the distance travelled, or combinations thereof.

19. A method comprising executing a machine learning model comprising an artificial neural network that has been trained to predict a use feature related to a personal care device based on data from a plurality of sensors including an accelerometer and a gyroscope located on an inertial measurement unit (IMU) of the personal care device, wherein the use feature comprises force applied by the personal care device, distance travelled by the personal care device, or combinations thereof, wherein, when the machine learning model comprising the artificial neural network is executed by the processor, force applied by the personal care device is predicted based only on accelerometer data and gyroscope data from the IMU input to a machine learning model that has been trained to predict and output a measurement value of the force, distance travelled by the personal care device is predicted based only on accelerometer data and gyroscope data from the IMU input to a machine learning model that has been trained to predict and output a measurement value of the distance travelled, or combinations thereof.

* * * * *